United States Patent
Vos et al.

(10) Patent No.: US 11,849,387 B2
(45) Date of Patent: Dec. 19, 2023

(54) METHOD AND APPARATUS FOR MANAGING DEVICE TO DEVICE COMMUNICATION

(71) Applicant: SIERRA WIRELESS, INC., Richmond (CA)

(72) Inventors: Gustav Gerald Vos, Tsawwassen (CA); Steven John Bennett, Coquitlam (CA); Recep Serkan Dost, Coquitlam (CA); Nikhil Karande, Coquitlam (CA); Lutz Hans-Joachim Lampe, Vancouver (CA)

(73) Assignee: SEMTECH CORPORATION, Camarillo, CA (US)

(*) Notice: Subject to any disclaimer, the term of this patent is extended or adjusted under 35 U.S.C. 154(b) by 0 days.

(21) Appl. No.: 18/249,484

(22) PCT Filed: Jul. 5, 2022

(86) PCT No.: PCT/CA2022/051060
§ 371 (c)(1),
(2) Date: Apr. 18, 2023

(87) PCT Pub. No.: WO2023/279203
PCT Pub. Date: Jan. 12, 2023

(65) Prior Publication Data
US 2023/0309001 A1    Sep. 28, 2023

Related U.S. Application Data

(60) Provisional application No. 63/235,573, filed on Aug. 20, 2021, provisional application No. 63/218,658, filed on Jul. 6, 2021.

(51) Int. Cl.
*H04W 48/16*    (2009.01)
*H04W 52/02*    (2009.01)

(52) U.S. Cl.
CPC ......... *H04W 48/16* (2013.01); *H04W 52/028* (2013.01)

(58) Field of Classification Search
CPC ........................... H04W 48/16; H04W 52/028
See application file for complete search history.

(56) References Cited

U.S. PATENT DOCUMENTS 9,113,352 B2    8/2015 Agarwal et al.
9,386,480 B2    7/2016 Papa et al.
(Continued)

FOREIGN PATENT DOCUMENTS

EP    2811776 B1    5/2018
EP    2489160 B1    7/2019
(Continued)

OTHER PUBLICATIONS

International Search Report and Written Opinion for corresponding International application No. PCT/CA2022/051060 dated Sep. 7, 2022 (17 pages).
(Continued)

*Primary Examiner* — Diane D Mizrahi
(74) *Attorney, Agent, or Firm* — Mendelsohn Dunleavy P.C.

(57) ABSTRACT

A methods and apparatuses for supporting device-to-device (D2D) communication in a wireless network is provided. According to embodiments, during a period where a D2D device 1 (D1) and a D2D device 2 (D2) are available for active D2D communications therebetween and when D2 identifies a need for a second communication with at least one of a base station or a different D2D device, the method includes transmitting, by D2, a D2D communication not available message (DNAM) to D1. The DNAM indicates that one or both of D1 and D2 are unavailable for active D2D communications therebetween. Upon receipt of the DNAM
(Continued)

by D1, the method further includes transitioning, by D1, to a listening mode for receiving at least a D2D communication available message (DAM) from D2. The DAM indicates that D1 and D2 are available for active D2D communications therebetween.

17 Claims, 23 Drawing Sheets

(56) References Cited

U.S. PATENT DOCUMENTS

| | | | |
|---|---|---|---|
| 9,615,340 | B2 | 4/2017 | Abedini et al. |
| 10,212,676 | B2 | 2/2019 | Ee et al. |
| 10,764,867 | B2 | 9/2020 | Chae et al. |
| 2014/0227997 | A1 | 8/2014 | Kim et al. |
| 2015/0071189 | A1 | 3/2015 | Park et al. |
| 2015/0119020 | A1 | 4/2015 | Henderson et al. |
| 2015/0215903 | A1 | 7/2015 | Zhao et al. |
| 2015/0271841 | A1 | 9/2015 | Yamada et al. |
| 2016/0037323 | A1 | 2/2016 | Kim et al. |
| 2017/0311113 | A1 | 10/2017 | Abraham et al. |
| 2019/0372647 | A1 | 12/2019 | Su et al. |
| 2020/0205016 | A1 | 6/2020 | Scott |
| 2020/0229206 | A1* | 7/2020 | Badic ............... H04W 52/0209 |
| 2020/0359366 | A1 | 11/2020 | Kim et al. |
| 2020/0367207 | A1 | 11/2020 | Rudolf et al. |
| 2020/0396716 | A1 | 12/2020 | Li et al. |
| 2021/0050931 | A1 | 2/2021 | Hahn et al. |
| 2021/0050950 | A1 | 2/2021 | Zhou et al. |
| 2021/0084559 | A1 | 3/2021 | Chaponniere et al. |
| 2021/0099994 | A1 | 4/2021 | Park et al. |
| 2021/0212106 | A1 | 7/2021 | Farag et al. |
| 2022/0094481 | A1 | 3/2022 | Hong et al. |
| 2022/0183091 | A1 | 6/2022 | Vos et al. |
| 2023/0014079 | A1 | 1/2023 | Vos et al. |

FOREIGN PATENT DOCUMENTS

| | | | |
|---|---|---|---|
| WO | 2021108897 | A1 | 6/2021 |
| WO | 2022120479 | A1 | 6/2022 |
| WO | 2022160068 | A1 | 8/2022 |
| WO | 2023279202 | A1 | 1/2023 |
| WO | 2023279203 | A1 | 1/2023 |

OTHER PUBLICATIONS

International Search Report and Written Opinion for corresponding International application No. PCT/CA2022/051059; dated Sep. 21, 2022; (10 pages).
International Search Report and Written Opinion for International application No. PCT/CA2021/051759; dated Mar. 7, 2022 (8 pages).
International Search Report and Written Opinion for International application No. PCT/CA2020/051632; dated Jan. 11, 2021; (10 pages).
Non-Final Office Action for U.S. Appl. No. 17/116,312; dated Jun. 2, 2022 (24 pages).
Notice of Allowance for U.S. Appl. No. 17/116,312; dated Oct. 5, 2022 (11 pages).
Guo, Jianlin, et al. "Recommended Practice for Local and Metropolitan Area Networks—Part 19: Coexistence Methods for 802.11 and 802.15.4 based systems operating in the Sub-1 GHz Frequency Bands." IEEE P802.19 Wireless Coexistance WG; document ID: IEEE P802.19-19/0035r3, Jul. 2019 (2019): 1-7.
ETSI TS 136.211 V15.7.0 Release 15 (Oct. 2019) "LTE; Evolved Universal Terrestrial Radio Access (E-UTRA); Physical channels and modulation." Section 9 (2019): pp. 188-198.
ETSI TS 136.211 V16.3.0 Release 16 (Nov. 2020) "LTE; Evolved Universal Terrestrial Radio Access (E-UTRA); Physical channels and modulation." Section 9 (2020): pp. 195-205.
ETSI TS 136.212 V15.7.0 Release 15 (Oct. 2019) "LTE; Evolved Universal Terrestrial Radio Access (E-UTRA); Multiplexing and channel coding." Section 5.4 (2019): pp. 234-237.
ETSI TS 136.212 V16.3.0 Release 16 (Nov. 2020) "LTE; Evolved Universal Terrestrial Radio Access (E-UTRA); Multiplexing and channel coding." Section 5.4 (2020): pp. 240-243.
ETSI TS 136.213 V15.7.0 Release 15 (Oct. 2019) "LTE; Evolved Universal Terrestrial Radio Access (E-UTRA); Physical ayer procedures." Sections 12 and 14 (2019): pp. 471; 476-503.
ETSI TS 136.213 V16.3.0 Release 16 (Nov. 2020) "LTE; Evolved Universal Terrestrial Radio Access (E-UTRA); Physical ayer procedures." Sections 12 and 14 (2020): pp. 490-491; 496-524.
ETSI EN 300 220-1 V3.1.1 (Feb. 2017) "Short Range Devices (SRD) operating in the frequency range 25 MHz to 1 000 MHz; Part 1: Technical characteristics and methods of measurement." (2017): pp. 1-74.

* cited by examiner

METHOD AND APPARATUS FOR MANAGING DEVICE TO DEVICE COMMUNICATION

CROSS-REFERENCE TO RELATED APPLICATIONS

This application claims the benefit of priority to U.S. Provisional Patent Application Ser. No. 63/218,658 entitled "Method and Apparatus for Managing Device to Device Communications in a Wireless Network" filed Jul. 6, 2021 and U.S. Provisional Patent Application Ser. No. 63/235,573 entitled "Method and Apparatus for Managing Device to Device Communication" filed Aug. 20, 2021, the contents of which are hereby incorporated by reference in their entirety.

FIELD

The present invention pertains in general to wireless communication and in particular to methods and apparatuses for managing device-to-device communications in a wireless network.

BACKGROUND

Device-to-device (D2D) communication, for example side link (SL) communication, can enable UEs to directly communicate with each other. D2D communications can be performed with or without assistance of a base station, which can potentially improve latency and battery life of the UE.

However, current D2D communication protocols have technical problems in certain situations. For example, an end node (EN) cannot establish D2D communication if the EN and gateway (GW) are using different cellular serving cells that are not synchronized. Another example would be that D2D data transmission rate can be very low, for example in the case of data transmission with polite spectrum access (PSA), as PSA requires a transmitter to remain off after a transmission and this results in unacceptable transmission gaps.

Therefore there is a need for a method and apparatus for managing device-to-device communications in a wireless network, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for managing device-to-device communications in a wireless network. In accordance with embodiments, there is provided a method for supporting device-to-device (D2D) communication in a wireless network, in accordance with embodiments of the present disclosure. The method is performed between a first D2D device (D1) and a second D2D device (D2). The method includes during a period where the D1 and the D2 are available for active D2D communications therebetween and when the D2 identifies a need for a second communication with at least one of a base station or a different D2D device, transmitting, by the D2, a D2D communication not available message (DNAM) to the D1. The DNAM indicates that one or more of the D1 and the D2 are unavailable for active D2D communications therebetween. Upon receipt of the DNAM by the D1, transitioning, by the D1, to a listening mode for receiving at least a D2D communication available message (DAM) from the D2. The DAM indicates that the D1 and the D2 are available for active D2D communications therebetween and the D2 is capable of performing both the D2D communication and cellular communication non-simultaneously.

In some embodiments, during the listening mode, upon the D2 identifying a need for a third communication, transmitting by the D2, a second DNAM. In some embodiments, one or more of the DNAM and the second DNAM are transmitted to one or more of a plurality of devices, wherein the plurality of devices includes at least the D1. In some embodiments, transitioning to the listening mode includes transitioning, by the D1, to a power saving mode, wherein the D1 sleeps for at least one sleep period upon transition to the power saving mode. In some embodiments a duration of the sleep period is specified in one or more of the DNAM and the second DNAM. In some embodiments, upon expiry of the sleep period, the D1 listens for one or more of the second DNAM or the DAM for a receive mode period. In some embodiments, upon non-receipt of the DAM or the second DNAM before expiry of the receive mode period, transitioning, by the D1, to a short power saving mode, wherein the D1 sleeps for a short sleep period during the short power saving mode. Upon expiry of the short sleep period, listening, by the D1, for one or more of the DAM and the second DNAM during a short wake up period.

In some embodiments, the DNAM or the second DNAM indicates whether one or more of the second communication or the third communication has a known duration. In some embodiments, the third communication is one or more of an extension of the second communication, a new D2D communication and a new cellular communication.

In some embodiments, transitioning to the listening mode includes transitioning, by the D1, to a short power saving mode, wherein the D1 sleeps for a short sleep period during the short power saving mode and upon expiry of the short sleep period, listening, by the D1, for the DAM or the second DNAM during a short wake up period. In some embodiments, the short sleep period has a duration, the duration is one or more of: a preconfigured period, a period signalled by the D2 and a period calculated based on a known formula. In some embodiments, the short sleep period is signalled by the D2 within the DNAM. In some embodiments, upon the D1 receiving the DAM, transmitting, by the D1, a message to the D2.

In accordance with embodiments, there is provided a method for supporting device-to-device (D2D) communication in a wireless network. The method is performed between two D2D devices (i.e., D1 and D2). D2D devices can be one or more of an end node (EN), a gateway (GW) and/or a mesh node. The method includes upon synchronization of the D1 and the D2, establishing a D2D connection between the D1 and the D2 using a D2D connection request (CRQ) and a D2D connection response (CRS). The method further includes transitioning to a D2D connected mode and performing data transmission between the D1 and the D2. The method further includes exiting from the D2D connected mode upon one or more of receipt of a D2D connection release request and expiry of an inactivity timer. Each of the D1 and the D2 is capable of performing both the D2D communication and cellular communication.

In some embodiments, D1 can be an end node and D2 can be a gateway. The method includes upon synchronization of the EN and the GW, establishing a D2D connection between the EN and the GW using a D2D connection request (CRQ) and a D2D connection response (CRS). The method further includes transitioning to a D2D connected mode and performing data transmission between the EN and the GW. The method further includes exiting from the D2D connected mode upon one or more of receipt of a D2D connection release request and expiry of an inactivity timer. Each of the EN and the GW is capable of performing both the D2D communication and cellular communication.

In some embodiments, establishing the D2D connection includes transmitting the D2D CRQ and receiving the D2D CRS with acceptance prior to transitioning to the D2D connected mode.

In some embodiments, the GW and the EN are engaged with two asynchronous cellular serving cells and the method further includes synchronizing the EN and the GW, wherein synchronizing includes detecting, by the EN, surrounding base transceiver stations (BTSs) e.g., synchronization signals from the surrounding BTSs) and discovering, by the EN, the GW attached to one of the detected BTSs. In some embodiments, synchronizing further includes prioritizing, by the EN, the detected BTSs based on one or more of a pre-configured list of prioritized public land mobile networks (PLMNs) and a quality of signal detection.

In some embodiments, the method further includes the EN synchronizing with the GW using cellular synchronization signals. In some embodiments, the EN identifies the GW using a D2D synchronization signal transmitted by the GW. In some embodiments, the GW transmits the D2D synchronization signal every Nth reception occasion (RO), wherein the N is indicative of one or more of a timing accuracy requirement of the RO and a timing accuracy capability of the EN. In some embodiments, the EN identifies the GW via the CRQ when the CRQ is transmitted using the discovery ID of the GW.

In some embodiments, the GW identifies an imminent upcoming cellular activity during the D2D connected mode and the method further includes terminating the D2D connection between the EN and the GW using an immediate release request (RRQ IR) and re-establishing the D2D connection between the EN and the GW.

In some embodiments, the imminent upcoming cellular activity has a known duration and the method further includes transmitting, from the GW to the EN, a D2D immediate release request including an indication of the known duration of the cellular activity and upon receiving the D2D immediate release request, transitioning, by the EN, to a sleep mode for the known duration. The method further includes upon completion of the known duration, transitioning, by the EN, to a wake up mode and transmitting, from the GW to the EN upon completion of the cellular activity and during the EN wake up mode, the D2D CRQ to re-establish the D2D connection within a connection request time period.

In some embodiments, the method further includes transmitting, from the GW to the EN, a D2D immediate release request with the field indicating that the imminent upcoming cellular activity has an unknown duration and upon receiving the D2D immediate release request, transitioning, by the EN, to a short D2D discontinuous reception (DRX) mode for a short D2D DRX cycle and to a wake up mode for a short D2D reception opportunity (RO) duration. The method further includes repeating the transitions if the cellular activity is incomplete during the short D2D RO duration and upon completion of the cellular activity, transmitting, from the GW to the EN, the CRQ to re-establish the D2D connection during the wake up mode.

In some embodiments, the cellular activity includes cellular connected mode discontinuous reception (jC-DRX). In some embodiments the EN transmits the D2D CRQ to the GW while the GW is performing a cellular activity, wherein establishing the D2D connection includes upon completion of the cellular activity, transmitting, from the GW to the EN, a D2D available message (DAM). Establishing the D2D connection further includes upon receipt of the DAM, transmitting, from the EN to the GW, the D2D CRQ and upon receipt of a D2D CRS with acceptance, transitioning to the D2D connected mode. In some embodiments, the transmission of the DAM is delayed for a period of time up to an available transmission time for the DAM. In some embodiments, the D2D communication is performed using a single radio and a single antenna.

In some embodiments, the data transmission is performed using one or more sub-bands in compliance with one or more spectrum transmission rules including a maximum percent transmission time and a minimum off time after transmission for each sub-band. In some embodiments, the number of the sub-bands and bandwidth of each sub-band are determined based on one or more of: the spectrum transmission rules, EN power consumption, short term sustained required data rates, long term sustained required data rates, average signal-to-noise ratio (SNR), scheduling efficiency, device cost device, duplexing protocol and capacity. In some embodiments, the spectrum transmission rules further include data transmission being performed after a clear channel assessment (CCA), the CCA configured for a bandwidth smaller than the sub-band. In some embodiments, data transmission is suspended within the CCA configured bandwidth upon failure of the CCA. In some embodiments, the configured bandwidth of the CCA is configured based on one or more of the spectrum transmission rules, bandwidth of each sub-band, short term data rates, long term data rates, average signal-to-noise ratio (SNR) and scheduling efficiency. In some embodiments, the data transmission is performed using one or more sub-bands in two D2D communication modes including polite spectrum access (PSA) mode and non-PSA mode.

In accordance with embodiments, there is provided a method for supporting device-to-device (D2D) communication in a wireless network. The method is performed between a first end node (EN1) and a second end node (EN2). Upon synchronization of the EN1 and the EN2, the method includes establishing a D2D connection between the EN1 and the EN2 using a D2D connection request (CRQ) and a D2D connection response (CRS). The method further includes transitioning to a D2D connected mode and performing data transmission between the EN1 and the EN2. The method additionally includes exiting from the D2D connected mode upon one or more of receipt of a D2D connection release request and expiry of an inactivity timer. Each of the EN1 and the EN2 is capable of performing both the D2D communication and a cellular communication.

In some embodiments, the EN2 is a mesh node.

In accordance with embodiments, there is provided a method for supporting device-to-device (D2D) communication in a wireless network. The method is performed between an end node (EN) and a gateway (GW). Upon synchronization of the EN and the GW, the method includes establishing a D2D connection between the EN and the GW using a D2D connection request (CRQ) and a D2D connection response (CRS). The method further includes transitioning to a D2D connected mode and performing data transmission between the EN and the GW. The method additionally includes exiting from the D2D connected mode upon one or more of receipt of a D2D connection release request and expiry of an inactivity timer. Each of the EN and the GW is capable of performing both the D2D communication and cellular communication.

In accordance with embodiments, there is provided an apparatus including a network interface for receiving data from and transmitting data to network devices connected to the wireless network, a processor and a machine readable memory storing machine executable instructions. The machine executable instructions, when executed by the processor configure the apparatus to perform one or more of the methods defined above.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 1 illustrates a flow of messages when transmitting transport blocks from an end node (EN) to a gateway (GW).

It will be noted that throughout the appended drawings, like features are identified by like reference numerals.

DETAILED DESCRIPTION

Definitions

Figure 2:
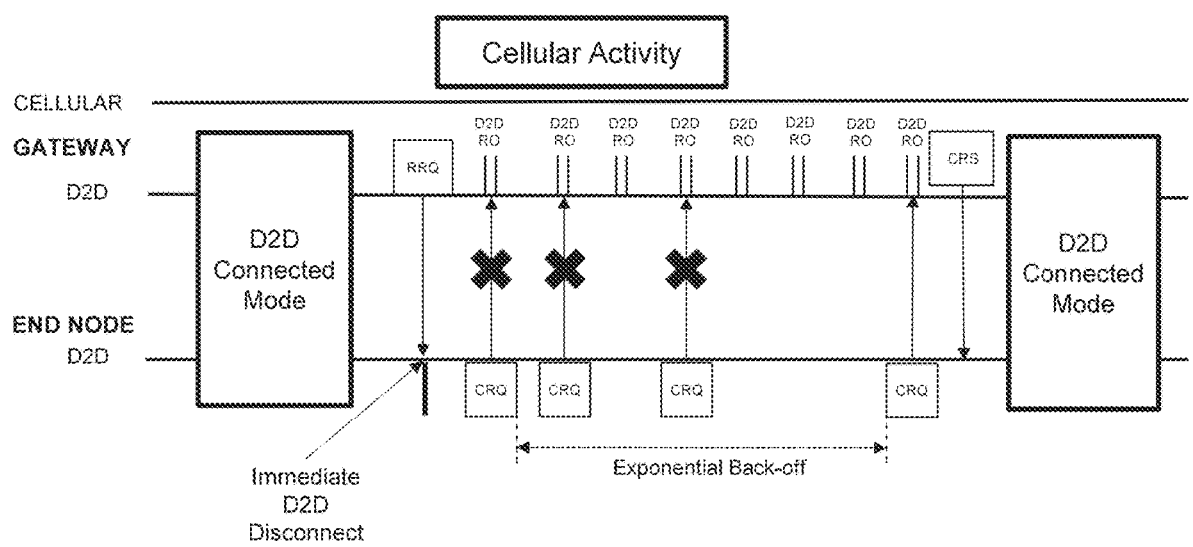
FIG. 2 illustrates an EN going into exponential back-off after the device-to-device (D2D) communication is disconnected.

In the present disclosure, it will be readily understood that communication between wireless devices can be enabled in multiple ways, and it can be defined as device to device (D2D) communications.

In the present disclosure, the terms "D2D" and "D2D communication" refer to any type of D2D communication such as sidelink (SL), wireless smart utility network (Wi-SUN™), digital enhanced cordless telecommunication (DECT™) 2020, Zigbee™ Wise™, etc. Said communication technologies are just examples and should not be construed as limiting in any way. It will be also understood that "Forte™", "Forte SideLink (SL)" and "Forte PSA" are further examples of non-limiting examples of D2D communications or protocols.

In the present disclosure, the terms "cellular" and "cellular communication" refer to any type of cellular communication, for example but not limited to orthogonal frequency-division multiplexing (OFDM) based cellular, and long term evolution (LTE) and new radio (NR).

In the present disclosure, the terms "modulation" and "modulation and coding scheme (MCS)" refer to any known modulation technique, for example but not limited to quadrature phase shift keying (QPSK), 16 quadrature amplitude modulation (QAM), 64QAM, Gaussian minimum-shift keying (GMSK), Adaptive modulation and the like or any combination thereof.

In the present disclosure, the term base station, base transceiver station (BTS) can be interchangeably used to define a base station of a cellular communication network and can include a NodeB, evolved NodeB (eNB), next generation NodeB (gNB) or other base station configuration as would be readily understood.

In the present disclosure, it will be readily understood that any features and embodiments thereof illustrated in the instant application are intended to be applicable to any D2D communications and protocols, including for example Forte. It will be further understood that while some of the discussion below relates to a certain D2D communication, for example SL communication, it would be readily understood that corresponding or similar steps and procedures illustrated in the present disclosure would be generally applicable to any types of D2D communication protocols, such as Forte protocol.

Unless defined otherwise, all technical and scientific terms used herein have the same meaning as commonly understood by one of ordinary skill in the art to which this invention belongs.

The present disclosure provides a method and apparatus for supporting device-to-device (D2D) communication in a wireless network. The D2D devices can be one or more of an end node (EN), a gateway (GW) and/or a mesh node. A GW can be a device which is connected to ENs and/or mesh nodes via a D2D protocol and can also connected to the cloud via cellular communication. The GW may aggregate and distribute traffic to and from the connected ENs and mesh nodes. The GW can also act as a data source or a data sink. A mesh node can be a device which is connected to ENs and other mesh nodes via a D2D protocol and may also be connected to a GW via D2D protocol. The mesh node may aggregate and distribute traffic to and from the connected ENs and other mesh nodes which not connected to a GW. The mesh node can also act as a data source or a data sink. An EN can be a device which is connected to one or more of a mesh nodes and/or GWs. The EN may act as a data source or data sink. One aspect of the present disclosure relates to a feature that a single D2D device (e.g. end node (EN), gateway (GW), user equipment (UE), a mesh node etc.) is able to perform both cellular communication and D2D communication (e.g. Forte). It should be readily understood that the procedures and methods disclosed herein can be carried out between any two D2D devices D1 and D2 (i.e., D1 and D2 can be any of EN, GW and/or mesh node). Even if some procedures and figures are explained using an EN and a GW, they are simply examples which can be more generally applied to any combination of D2D devices. According to embodiments, a D2D connection between an end node (EN) and a gateway (GW) is established using a D2D connection request (CRQ) and a D2D connection response (CRS). Upon transitioning to a D2D connected mode, the EN and GW can perform data transmission.

When the data transmission is completed or when certain situations occur, as disclosed elsewhere herein, the EN and GW can exit from the D2D connected mode via a D2D connection release request or the exit from D2D connected mode can occur upon expiry of an inactivity timer. According to embodiments, the D2D connection procedures disclosed herein can also be applied for D2D connection between two end nodes and/or between one end node and a mesh node. According to embodiments, the D2D connection procedures can be performed using a single radio and/or a single antenna.

Forte SideLink

When an end node (EN) requires synchronization with a gateway (GW), one way to achieve synchronization is to prompt the GW to send a D2D synchronization signal (e.g. a Forte SL synchronization (F-SS)) to the EN. Another way to achieve synchronization is for the ENs and GWs to be synchronized using cellular synchronization signals. Before a GW or EN sends a D2D connection request (CRQ) signal (e.g. a Forte CRQ), the GW or EN will need to synchronize with the other party with which D2D communication is desired.

In wireless communication, the physical layer of the control channel is often different from the physical layer of the data channel. Some non-limiting examples of the physical layer control channel include physical downlink control channel (PDCCH) for LTE and machine type communication (MTC) and a PDCCH (MPDCCH) for LTE-MTC (LTE-M).

A control message which can be transmitted on the control channel often needs to include information associated with one or more of the following fields:
  source (SRC) identifier (ID) (e.g. radio network temporary identifier (RNTI) of the SRC device)
  destination (DST) ID (e.g. RNTI of the DST device)
  connection request (CRQ)—used to initiate a D2D connection
  connection response (CRS)—sent in response to a CRQ to indicate acceptance or rejection of the connection request (e.g. with back-off time, etc.)
  release request (RRQ)—sent to initiate a D2D connection release
  GRANTS—for indicating one or more of the followings:
    resource (e.g. 4 physical resource blocks (PRBs), etc.)
    modulation and coding scheme (MCS)
    new data indication (NDI)
    channel quality indicator (CQI)—for adaptive modulation and power control
    ACK/NACK hybrid automatic repeat request (HARQ) ID (e.g. 1 bit per HARQ ID)

As a non-limiting example, a D2D connected mode procedure can be defined based on the following sequence of steps. First, an EN and a GW perform synchronization, wherein the EN and GW attempt to synchronize their timing with each other. Upon synchronization, the EN may send a D2D connection request (CRQ) to the GW. In response to the D2D CRQ received from the EN, the GW sends an acceptance in the D2D connection response (e.g. Forte CRS). The GW can subsequently enter D2D connected mode (e.g. Forte connected mode). The EN enters the D2D connected mode (e.g. Forte connected mode) after it sends the D2D connection request (e.g. Forte CRQ) and receives the D2D connection request accept response (e.g. Forte CRS accept) from the GW.

During D2D connected mode, the EN and the GW adhere to a fixed scheduling mode, wherein the EN and GW know exactly when they are permitted to transmit data to each other. For example, this may be provided by a time division duplex (TDD) frame pattern that is fixed with a certain time period.

The EN and GW can exit from the D2D connected mode (e.g. Forte connected mode) when one or more of the following occurs: 1) both the EN and the GW send a D2D release request (e.g. a Forte RRQ); 2) after an inactivity timer (e.g. T_INACTIVITY in Forte) expires; and 3) after the EN and/or GW send the D2D connection response reject (e.g. Forte CRS reject) to each other.

Figure 1:
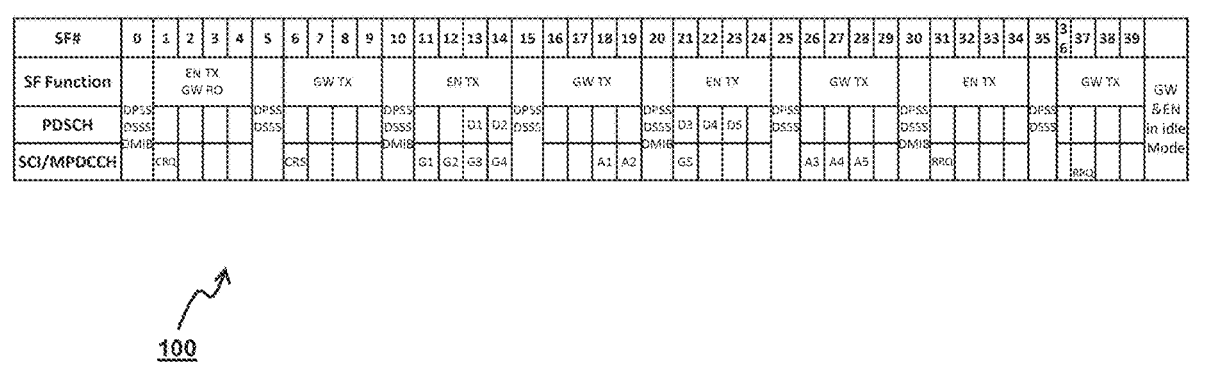

FIG. 1 illustrates a flow of messages 100 when transmitting transport blocks from the EN to the GW. Referring to FIG. 1, TDD frame pattern is fixed with period of 10 ms and each pattern starts when SF number (SFN) ends with 0 (i.e. when mod(SFN,10)=0). It should be noted that the GW can typically support only one EN at one time (i.e., only one EN can be in connected mode at a time with the GW).

At subframe (SF) #0, the GW sends D2D synchronization signals—one or more of D2D primary synchronization signals (DPSS), D2D secondary synchronization signals (DSSS) and D2D master information block (DMIB). It should be noted that DPSS, DSSS and DMIB are non-limiting examples of D2D synchronization signals. In this example, the three synchronization signals DPSS, DSSS and DMIB are transmitted when mod(SFN,10)=0.

At SF #5, the GW sends DPSS and DSSS for D2D synchronization. In this example, the two synchronization signals DPSS and DSSS are transmitted when mod(SFN, 10)=5.

At SF #1, the EN sends the CRQ to the GW. Specifically, the EN sends the control indication for D2D (CID) connection request to the GW during the time period that the GW can receive the D2D signals. This time period can be referred to as the GW's reception opportunity (GW RO). In this case, the GW RO would be SF #1 to SF #4.

At SF #6, the GW, in response to the CRQ, sends the connection response (CRS) to the EN. Specifically, the GW sends the CID connection response to the EN. The CRS or the CID connection response includes an acceptance of the CRQ that the GW received from the EN in SF #1.

From SF #11 to SF #14, four grants (i.e. G1, G2, G3, G4) for four TB transmissions are transmitted to the GW. The fifth grant (i.e. G5) for the last TB transmission is transmitted to the GW at SF #21. Each grant sent to the GW may include MCS (modulation and coding schemes), resources or both.

When the grant for each TB transmission is transmitted, data (e.g. TB) is transmitted to the GW by the EN. For example, the first two TB transmissions (i.e. D1, D2) is done at SF #13 and SF #14, as the grants (i.e. G1, G2) for the TB transmissions are transmitted at SF #11 and SF #12, respectively. The remaining TB transmissions (i.e. D3, D4, D5) are similarly transmitted at SF #21 to SF #23.

Upon successful TB transmission, the GW sends, to the EN, an acknowledgement for each TB transmission. Specifically, the acknowledgements (i.e. A1, A2) for the first two TB transmissions are transmitted at SF #18 and SF #19. The remaining acknowledgments (i.e. A3, A4, A5) are similarly transmitted at SF #26 to SF #28.

When all TB transmissions are completed and acknowledged, the release request (RRQ) is transmitted from the EN to the GW at SF #31, and vice versa (i.e. from the GW to the EN) at SF #37. Upon transmission of the RRQ, the EN and GW exit from the connection mode.

There exists a Long D2D discontinuous reception (LG_DDRX) mode. In this mode, the D2D device sleeps for a certain period of time (e.g. LG_DDRX in SF) and then the D2D device wakes up for a period of time (e.g. the reception opportunity (RO)) for data reception. The LG_DDRX RO can be defined by Equation 1 below, which is based on the ID of the D2D device (e.g. Forte RNTI). For example, the RO can be defined as the one or more system frame numbers that satisfy Equation 1.

$$\text{mod}(\text{FRAME\_NUM}, \text{LG\_DDRX}) = \text{HASH}(\text{RNTI}) + \text{ForteOffset} \qquad (5)$$

where ForteOffset can be preconfigured and the HASH equation is specified or known.

D2D Support in the Case of Different Serving Cells

If an EN and a GW are connected to the same cellular serving cell (e.g., the same BTS), the EN and GW can be synchronized (e.g. with up to 2 cyclic prefix (CP)) and therefore can establish a D2D connection therebetween (e.g. a Forte SL connection). However, if the EN and the GW are connected to different cellular serving cells (i.e. not engaged with the same cellular serving cells) and those cells are asynchronous (i.e. not synchronized), the EN cannot establish a D2D connection with the GW due to this lack of synchronization.

Some of the solutions that may be able to resolve the above issue are explained below. For example, the EN can obtain a timing offset between the serving cells from a D2D wireless network server (e.g. a Forte self-organizing network (SON) server), assuming that the timing offset is fixed. To obtain the timing offset, the EN establishes a cellular connection with the D2D wireless network server (e.g. Forte SON server). In order to contact the D2D wireless network server, the EN must be attached to the cellular network. However, merely using the cellular synchronization signal would not be sufficient to attach to the network since a cellular subscription is needed for that, which may not be always desirable. In another example, the GW sends out D2D synchronization signals (e.g. Forte SL synchronization (F-SS)). The EN can synchronize using the D2D synchronization signals transmitted by the GW. However, transmitting (e.g. broadcasting) D2D synchronization signals (e.g. Forte SL synchronization (F-SS)) has an impact on the battery power and system resources.

Various embodiments of the present disclosure provide a way of resolving the above issues. According to embodiments, the EN performs a deep search for all surrounding base transceiver stations (BTS) in all networks including all public land mobile networks (PLMNs). Put another way, the EN attempts to decode cellular synchronization signals from all possible BTSs. The longer correlation times, the higher the maximum coupling loss (MCL) that can result when cellular synchronization signals are decoded. Generally speaking, the higher MCL, the farther away the synchronization signals are being transmitted, namely the distance between the EN and that particular BTS is greater. The cellular synchronization signals that are decoded may include one or more of primary synchronization signal (PSS), secondary synchronization signal (SSS), master information block (MIB) and system information block (SIB).

The EN may receive cellular synchronization signals from multiple BTSs. As most cellular BTSs are synchronized within a few milliseconds (ms), the EN may not need to decode either the MIB in order to obtain the subframe number (SFN) or the SIB in order to obtain the hyper-frame. The EN can be synchronized with the BTS using the received cellular synchronization signals.

The EN can optionally prioritize the list of detected BTSs based on one or more of a pre-configured list of prioritized PLMNs or the quality of signal detection, which is indicative of the distance to the BTSs. For each detected BTS, the EN can attempt to discover a GW using that BTS's timing. In order to discover a GW, the EN, for example, may send out a D2D CRQ message. If the GW is attached to a particular BTS, the timing of the GW and the attached BTS will match. Provided that the EN can be synchronized with the BTS, the GW and the EN would then be synchronized through the attached BTS. Therefore, the GW with timing that matches the timing of the BTS (e.g. GW attached to the BTS) can receive the connection request from the EN and respond with a connection response message to the EN.

However, after a certain number of unsuccessful attempts, the EN can decide that there is no GW in range. The number of (unsuccessful) attempts to be made can be predetermined or dynamically configured. Upon the determination that no GW is in range, the EN can contact the D2D wireless network server (e.g. the Forte SON server) to obtain one or more of additional information (e.g. surrounding GWs, Offsets etc.) and receive instructions (e.g. to become a GW itself).

In the above embodiment, a cellular subscription is not frequently required in order to reach the D2D wireless network server, and thus costs associated therewith can be reduced.

Identifying GW Using Cellular Synchronization Signal

The EN is usually aware of the ID of the GW before it makes a connection request (CRQ). For example, in Forte SL, the EN identifies the GW using the RNTI (i.e., GW ID) before sending a Forte CRQ. If the EN uses the cellular synchronization signal to synchronize with the GW without using the GW's D2D synchronization signal (e.g. F-SS) which normally carries the ID of the GW, the ID of the GW is unknown to the EN. Therefore, it is desired for the EN to be able to identify the ID of the GW (e.g. in Forte SL, RNTI of the GW) when the EN uses cellular synchronization signals.

According to embodiments, when the EN uses cellular synchronization signals, the EN can identify the ID of the GW using the D2D synchronization signals which may be infrequently transmitted by the GW to advertise the GW ID. In other words, the GW sends D2D synchronization signals (e.g. F-SS in Forte) in order to advertise its ID (e.g. RNTI in Forte) infrequently.

Specifically, the GW sends D2D synchronization signals with the GW ID every $N^{th}$ reception occasion (RO). The Nth RO can be determined based on for example, LG_DDRX and/or GW ID. The selection of N for the $N^{th}$ RO may also depend on one or more of the timing accuracy requirements of the RO and the timing accuracy capability of the EN. In some embodiments, alternately or additionally, the GW can, at selected times send D2D synchronization signals (which may contain the GW ID) based on one or more of the ID of the cellular BTS with which the GW (and the EN) is synchronizing, the ID of the GW, and the preconfigured D2D synchronization period. For example, the preconfigured D2D synchronization period can be X numbers of frames or N ROs.

Even if N=1, where the GW sends the D2D synchronization signal before every D2D RO, and the LG-DDRX is very long (for example in the range of 10 minutes), it can take a very long period of time for the EN to acquire the GW ID, since the EN has to decode many D2D channels for a very long time which consumes a lot of power. For example, if there are 10 D2D channels to search and LG-FDRX is 10 minutes, it could take up to 10×10=100 minutes to find the D2D synchronization signal. If the GW instead sends a D2D synchronization signal based on the cellular BTS ID and the D2D channel (not on the RO), since the EN also knows the BTS ID and D2D channel, it will know when the GW will send the D2D sync and not spend time looking for D2D sync at the wrong time. The 10 ms frame number when the GW is to send D2D sync and the EN is to search for D2D Sync is when the follow equality holds:

$$\mathrm{mod(FRAME\_NUM, D2D\_SYNC\_PERIOD)} = \mathrm{mod(BTS\_ID*NUM\_D2D\_CHANNELS + D2D\_CHANNEL, D2D\_SYNC\_PERIOD)}$$

where FRAME_NUM is in units of 10 ms (e.g., in LTE the frame number is a combination of the hyper-frame (HSFN) and system frame number(SFN) equating to HSFN*1024+SFN); and where D2D_SYNC_PERIOD is the D2D synchronization period in units of SFN (i.e. 10 ms for LTE).

In the above embodiment, when more than one GW is synchronized to the same cell ID, they would be required to send D2D sync within the same SFN or frame number. Given a SFN is only 10 ms, there is a high chance of collision. To solve this a SEARCH_TIME can be introduced to reduce collisions of co-located GW D2D synchronization signals. The GW may autonomously decide which SFN within the SEARCH_TIME to send the D2D SYNC (i.e. the D2D_SYNC_LOCATION) or the SON controller may assign the location to ensure no collisions. The frame number (e.g., HSFN and SFN) for the EN to start to search for the SYNC is when:

$$\mathrm{mod(FRAME\_NUM, D2D\_SYNC\_PERIOD)} = \mathrm{mod((BTS\_ID*NUM\_D2D\_CHANNELS + D2D\_CHANNEL)*SEARCH\_TIME, D2D\_SYNC\_PERIOD)}$$

where SEARCH_TIME is the window where the EN needs to search for the D2D synchronization signal in units of SFN (i.e. 10 ms for LTE)

The FRAME_NUM for the GW to send D2D sync is when:

$$\mathrm{mod(FRAME\_NUM, D2D\_SYNC\_PERIOD)} = \mathrm{mod((BTS\_ID*NUM\_D2D\_CHANNELS + D2D\_CHANNEL)*SEARCH\_TIME, D2D\_SYNC\_PERIOD) + D2D\_SYNC\_LOCATION}$$

where D2D_SYNC_LOCATION is the frame number (e.g., SFN) within the SEARCH_TIME window where the D2D synchronization signal is sent It should be noted that in various embodiments, the D2D_SYNC_LOCATION, NUM_D2D_CHANNELS, D2D_SYNC_PERIOD and SEARCH_TIME parameters can be preconfigured in the EN and the GW or can be assigned by the SON controller.

With respect to the procedures performed at the EN, the EN can use the cellular synchronization signal to synchronize with the GW. The EN may not use the D2D synchronization signal that is transmitted infrequently for synchronization, at least in part due to the long synchronization process which can result in poor battery life and poor connection time. The EN can determine the approximate time that the GW will send the D2D synchronization signal based on the cellular BTS ID and the preconfigured D2D synchronization period. As such the EN may sleep and subsequently wake prior to the determined approximate time that the GW is to send the D2D synchronization signal. When the EN wakes up, the EN can search for the D2D synchronization signal at least for the (preconfigured) SEARCH_TIME. In some embodiments, when the EN detects multiple cellular synchronization signals and the EN can perform the above operations in parallel.

In some embodiments, the GW can send a shorter D2D synchronization signal when synchronization is not needed (i.e., when sync is done using other methods (e.g., using cellular sync signals) and when EN is not dependent on D2D sync signal for synchronizing with the GW) and the GW ID (e.g. GW RNTI) can be determined based at least in part on the cellular subframe on which the discovered D2D synchronization signal is decoded.

EN may be able to identify the ID of the GW (e.g. in Forte SL, RNTI of the GW) when the EN uses a cellular synchronization signal. According to embodiments, when the EN uses cellular synchronization signal, the EN can identify the ID of the GW through the CRQ connection requests on the discovery ID (e.g. D-RNTI).

In some embodiments, the GW listens for connection request using a discovery ID (e.g. D-RNTI) on a reception opportunity (RO), denoted as a discovery RO, in addition to the RO determined from the LG-DDRX. The time period of the discover RO is denoted as DISC_LG_DDRX. The DISC_LG_DDRX is typically much longer than the LG_DDRX in order not to use too much power. Although the longer DISC_LG_DDRX extends the time for discovery, this extended period of time may generally be acceptable as discovery occurs infrequently.

According to embodiments, without discovering the GW, the EN can determine one of more of the followings.
 discovery ID of the GW (e.g. D-RNTI)
 discovery period (e.g., DISC_LG_DDRX) used by the GW
 options for determining discovery ID and period:
  pre-configured (e.g. from the factory or on-site), or
  based on the GW's serving cellular information (e.g. BTS ID)
   e.g. discovery ID=hash(BTS_ID)
The discovery RO frame number is when:

Mod(FRAME_NUM,DISC_LG_DDRX)=D-RNTI

It should be noted that using the discovery ID based on the GW's service cellular information may identify more than one GW responding to the CRQ. The multiple responses will occur when more than one GW is using the same cell for sync and thus will have the same discovery RO location. In such cases, the EN can attempt to discover the GW for each CRS that is decoded. As such, in various embodiments, the GW can randomize the CRS in both time and frequency, to avoid collisions.

Upon determining the discovery ID and the discovery period, the EN can determine the discovery RO on which the EN is to send the Connection requests CRQs, based on the discovery ID and discovery period determined in addition to the long discontinuous reception (DRX) rules.

The following is an example of the procedures performed at the EN.
 The EN selects a random temporary ID (e.g. side link temporary RNTI (SL-T-RNTI)) for itself in a randomly determined range (e.g. FF00 to FFFF).
 The EN synchronizes to the cellular network, for example the EN synchronizes with the eNB (evolved NodeB) or gNB (next generation NodeB), and calculates the GW's discovery RO location based on the discovery ID and the discovery period.
 The EN sends a D2D connection request on the GW's discovery RO. In the request, the DST ID (destination ID) field of the CID (Control Indication for D2D) is set as the discovery ID of the GW (e.g. D-RNTI), and the SRC ID (source ID) field of the CID is set as the EN's temporary ID (e.g., SL-T-RNTI).
 The GW responds with a CRS connection response. In the response, the SRC ID field of the CID is set as the GW's true ID. As illustrated above, the GW can randomize the CRS connection response in both time and frequency in order to avoid the collisions with other GW(s).
 The EN changes the DST ID field in the CID to the GW's true ID for the transmission of any further control messages. If more than one GW responds to the CRQ, the EN selects only one GW, for example the GW with the best quality to respond, and sets the ID (e.g. RNTI) of the selected GW as the DST ID in the CID.
 The EN may optionally initiate a two-way EN/GW authentication process.
 When used, if the authentication process is successful, the GW assigns a unique ID (e.g. SL-C-RNTI) and allows the EN to access the packet data network (PDN).

D2D and Cellular Collision Handling

Since the network devices (e.g. GW and/or EN and/or mesh node) are capable of performing both cellular and D2D communication, in some instances there can be collisions for example when one type of communication (e.g. D2D communication) occurs with respect to a device (e.g. GW) while that device is performing the other type of communication (e.g. cellular activity).

If a GW needs to perform some cellular activity while it is engaged in active D2D communications (e.g. Forte connected mode) with an EN, the D2D connection needs to be terminated in order to proceed with the cellular activity. However, it takes a long time to re-establish (or re-connect) the D2D communication after the cellular activity has completed. This re-connection time can take a long period because either the EN can be going into exponential back-off or the GW may have a long LG_DDRX cycle. FIG. 2 illustrates an EN going into exponential back-off after the D2D communication is disconnected.

Some cellular activities have an approximately known duration and some cellular activities do not. Some non-limiting examples of cellular activities with known and unknown durations are provided below. It should be noted that the numbers in the brackets are merely examples of the approximate time duration needed to perform each activity.
 Examples of cellular activities with a known duration:
  paging (i.e. decoding of paging opportunity)—[e.g. <30 ms]
   includes decoding of paging message on PDSCH
  inter-band passive scanning for idle mode mobility—[e.g. <30 ms]
  intra-band passive scanning for idle mode mobility—[e.g. <30 ms per band]
  system information updates when only SIB1 is needed (usually every 4 hours but can be longer)—[e.g. <10 ms]
  tracking area update [e.g. ~300-600 ms]
  system information updates when all SIB need update (very rare)—[e.g. ~100-300 ms]
 Example of cellular activities with a unknown duration:
  User data connections [e.g. >300 ms]

According to embodiments, when the GW identifies or determines that there is an imminently upcoming cellular activity and the duration of that activity is approximately known, the GW terminates the D2D connection with the EN by transmitting an immediate release request (e.g. RRQ IR) to the engaged EN. In various embodiments, the immediate release request includes a field containing the time duration required to complete the cellular activity (e.g. T_BUSY). The time duration required to complete the cellular activity may be determined by the GW. In some embodiments, the time duration required to complete the cellular activity may be set slightly longer than the actual time duration needed for the cellular activity (e.g. the time duration, the GW knows for certain, that the activity can be completed).

Upon reception of the immediate release request (e.g. RRQ IR) with the time duration required to complete the cellular activity (e.g. T_BUSY), the EN sleeps for the received time duration required to complete the cellular activity (e.g. T_BUSY). After the time duration required to complete the cellular activity (e.g. T_BUSY), the EN wakes up and listens for a connection request for a pre-determined period (e.g., T_AVAIL). The pre-determined period for which the EN will listen for a connection request can be pre-configured or dynamically signaled. For example, the time period for a connection request (e.g. T_AVAIL) is included in the RRQ IR or dynamically signalled. The GW can re-initiate the connection after the time duration required to complete the cellular activity (e.g. T_BUSY) but within the time period for a connection request (e.g. T_AVAIL) by sending a connection request signal (e.g. CRQ) to the EN. It should be noted that the RRQ IR and the CRQ are control plane messages (for example a CID).

Figure 3:
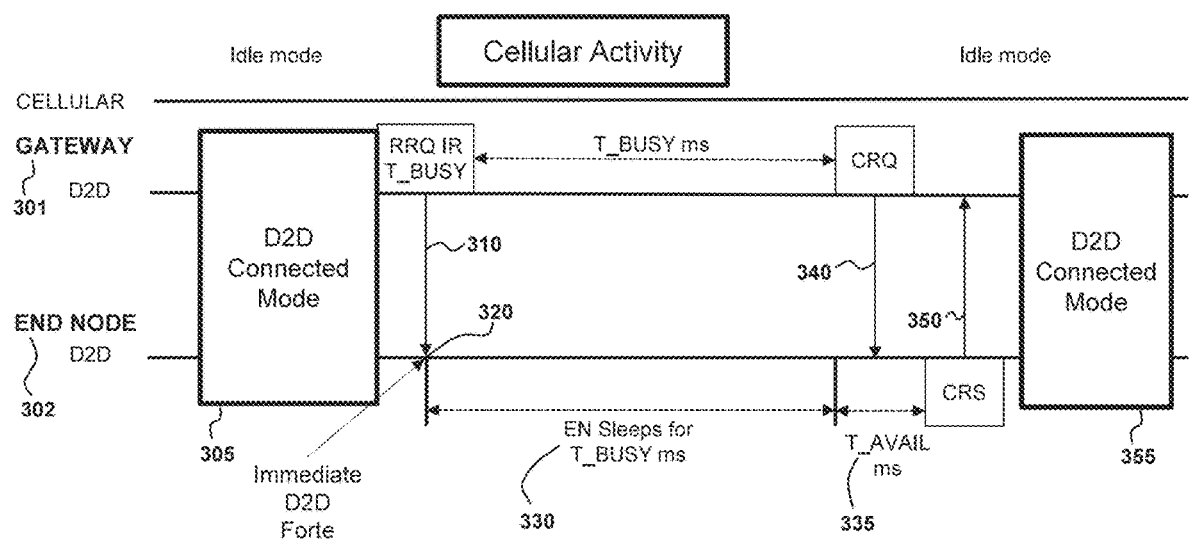
FIG. 3 illustrates a procedure for re-establishing a D2D communication between an EN and a GW after a cellular activity for a known period of time, in accordance with embodiments of the present disclosure.

FIG. 3 illustrates a procedure for re-establishing a D2D communication between an EN and a GW after the GW performs a cellular activity for a known period of time, in accordance with embodiments of the present disclosure. Referring to FIG. 3, the GW 301 and the EN 302 are in the D2D connected mode 305, and there is no cellular activity for the GW 301. When the GW 301 identifies or determines that there is an imminently upcoming cellular activity, the GW 301 transmits 310 an immediate release request (RRQ IR) to the engaged EN 302. A field containing the time duration required to complete the cellular activity (T_BUSY) is included in the RRQ IR. Upon receipt 320 of the RRQ IR with T_BUSY, the EN 302 sleeps 330 for T_BUSY. After the time duration required to complete the cellular activity (i.e. T_BUSY), the cellular activity is complete and therefore the GW 301 transmits 340 a connection request signal (CRQ) to the EN 302. The GW 301 transmits 340 the CRQ to the EN 302 within the time period for a connection request (T_AVAIL). T_AVAIL may be predetermined or dynamically signalled. In response to the CRQ, the EN 302 transmits 350 a connection response (CRS) to indicate acceptance of the connection request. Subsequently, the GW 301 and the EN 302 have reentered D2D connected mode 355.

According to embodiments, when the GW identifies or determines that there is an imminently upcoming cellular activity but the duration of that activity is unknown, the GW terminates the D2D connection with the EN by transmitting an immediate release request (e.g. RRQ IR) to the engaged EN. In various embodiments, the immediate release request includes a field informing the EN of the imminently upcoming cellular activity that will be performed for an unknown duration (e.g. cellular activity unknown duration (CAUD)). Upon reception of the immediate release request (e.g. RRQ IR) with the field indicating the unknown duration cellular activity (e.g. CAUD), the EN enters into a short D2D DRX mode. In the short D2D DRX mode, the EN sleeps for a short D2D DRX cycle (i.e. SH_DDRX in SFs) and wakes up (e.g. transfers to wake up mode) for a short D2D RO duration. The short D2D DRX RO can be determined, for example in a similar manner to that of the long DRX mode. For example, the short D2D DRX RO is associated with the system frame number(s) as defined below, where the RNTI and SH_DDRX can be those associated with the EN or the GW.

$$\mathrm{mod}(\mathrm{FRAME\_NUM}, \mathrm{SH\_DDRX}) = \mathrm{HASH}(\mathrm{RNTI}) + \mathrm{ForteOffset}$$

where ForteOffset is preconfigured and the HASH equation is specified or known.

In various embodiments, the short D2D DRX cycle (i.e. SH_DDRX) can be associated with the EN, the GW or both, unless there is a specific indication that the SH_DDRX is to be associated with only one of the EN or the GW. The SH_DDRX can be pre-configured or signaled by the GW, for example within the RRQ IR. When the GW is ready to re-initiate the D2D connection, the GW sends a connection request signal (e.g. CRQ) to the EN during the short D2D DRX RO associated with the EN.

It should be noted that the SH_DDRX, which is typically 100~500 ms, can be used instead of the LG_DDRX, which is typically 80 seconds~10 minutes, as the SH_DDRX can provide more opportunities for the GW to send the connection request signal (e.g. CRQ) with a smaller delay. In various embodiments, long D2D DRX mode can be used by the EN as this mode is the most power efficient. The EN transitions from long DRX mode to short D2D DRX mode when the EN is in D2D connected state. The EN is typically in a short DRX state (e.g. associated with short DRX mode) when the GW is in active cellular communication. Short D2D DRX mode can be used as per the methods and embodiments illustrated in the present disclosure. If long D2D DRX mode is used instead of short D2D DRX mode, there will be fewer opportunities for the GW to send the connection request signal (e.g. CRQ) and thus there will be more delay.

It should be further noted that simply shortening the value of LG_DDRX parameter to match the SH_DDRX parameter will proportionally increase the power consumption. For example, if the LG_DDRX is set to 100 milliseconds instead of 10 seconds, the power consumption of the LG DRX mode will increase by approximately 100 times (i.e. 10000/100). As many IoT (internet of things) applications transmit data infrequently, the EN would be in the Long DRX state most of the time (e.g. 99% of the time) and thus power optimization of the long DRX can be important.

Figure 4:
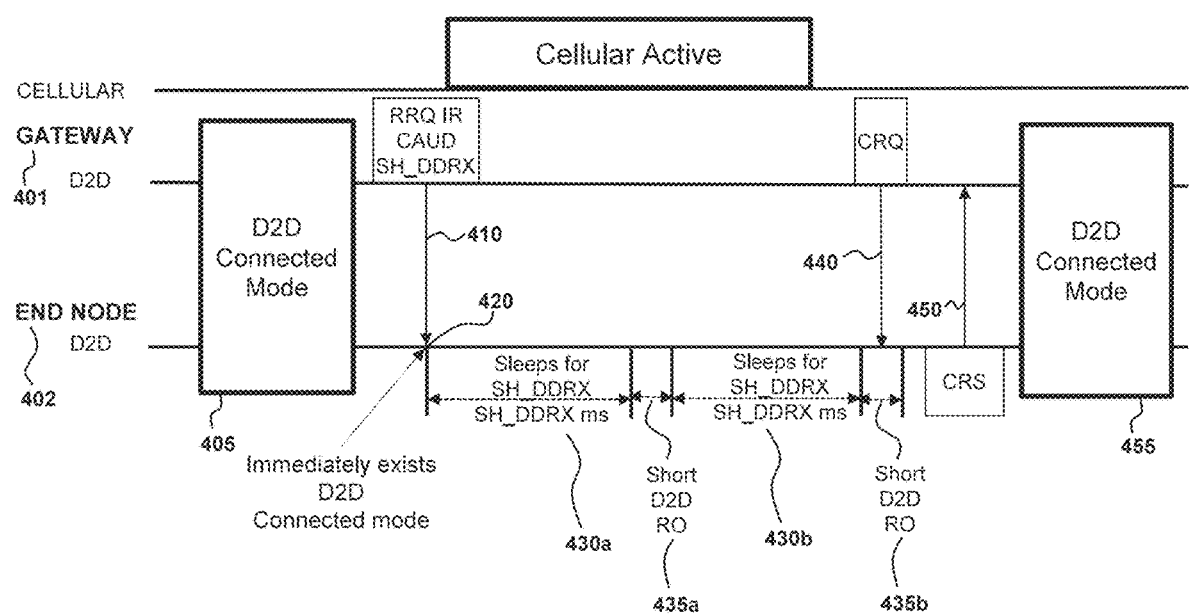
FIG. 4 illustrates a procedure for re-establishing a D2D communication between an EN and a GW after a cellular activity for an unknown period of time, in accordance with embodiments of the present disclosure.

FIG. 4 illustrates a procedure for re-establishing a D2D communication between an EN and a GW after cellular activity for an unknown period of time, in accordance with embodiments of the present disclosure. Referring to FIG. 4, the GW 401 and the EN 402 are in the D2D connected mode 405, and there is no cellular activity for the GW 401. When the GW 401 identifies or determines that there is an imminently upcoming cellular activity, the GW 401 transmits 410 an immediate release request (RRQ IR) to the engaged EN 402. A field informing the EN 402 that the imminently upcoming cellular activity will be performed for an unknown duration (e.g. CAUD) is included in the RRQ IR. The RRQ IR may further include data indicative of the short D2D DRX cycle (e.g. SH_DDRX). Upon receipt 420 of the RRQ IR with CAUD and SH_DDRX, the EN 402 enters into a short D2D DRX mode and sleeps 430a for a time period associated with the SH_DDRX. After the time period of SH_DDRX, the EN 402 wakes up for the short D2D RO duration 435a and identifies or determines if there is a connection request signal (e.g. CRQ) to receive. As the cellular activity is not complete at this time and no CRQ is received during the short D2D RO duration 435a, the EN 402 enters into a short D2D DRX mode and again sleeps 430b for the time period of associated with the SH_DDRX. After the time period of SH_DDRX, the EN 402 wakes up for the short D2D RO duration 435b and identifies or determines if there is a connection request signal (e.g. CRQ) to receive. As the cellular activity is complete this time, the GW 401 is ready to re-initiate the D2D connection with the EN 402. The GW 401 sends the CRQ to the EN 402 during the short D2D DRX RO 435b. In response to the CRQ, the EN 402 transmits 450 a connection response (CRS) to indicate acceptance of the connection request. Subsequently, the GW 401 and the EN 402 have returned to the D2D connected mode 455.

Figure 5:
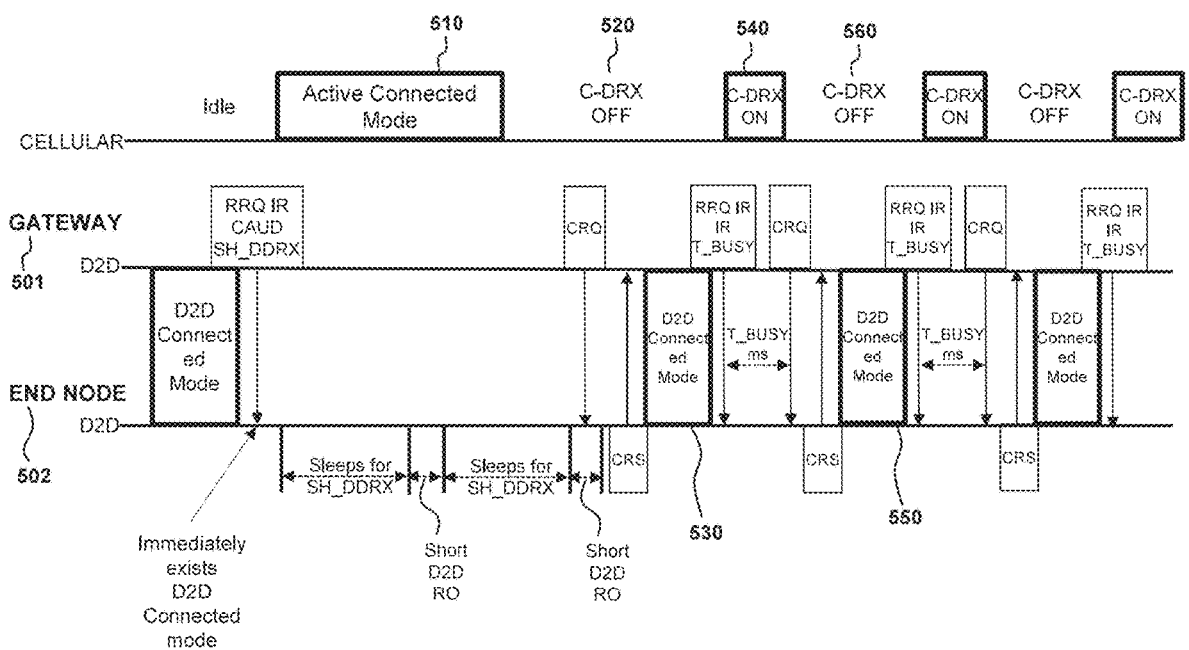
FIG. 5 illustrates how an immediate release request with a cellular activity of unknown duration and another immediate release request with time duration required to complete the cellular activity can be used, in accordance with embodiments of the present disclosure.

According to embodiments, the procedures illustrated above (e.g. procedures in FIGS. 3 and 4) can be used to support D2D communication during the cellular C-DRX (connected mode DRX). The C-DRX can be treated as cellular activity of known duration. FIG. 5 illustrates how an immediate release request (RRQ IR) with cellular activity of unknown duration (e.g. CAUD) and another RRQ IR with time duration required to complete the cellular activity (e.g. T_BUSY) can be used, in accordance with embodiments of the present disclosure. The D2D communication between the GW 501 and the EN 502 can be performed in the same manner as illustrated above and illustrated in FIGS. 3 and 4.

Referring to FIG. 5, when the GW 501 identifies or determines that there is an imminently upcoming cellular activity of unknown duration (CAUD), the GW 501 transmits an immediate release request (RRQ IR) to the engaged EN 502 to inform the EN that the imminently upcoming cellular activity will be performed for an unknown duration (CAUD). The GW 501 will be in the active connected mode 510 while the cellular activity is performed for CAUD. When the cellular activity of unknown duration is complete, the GW 501 will be in the D2D connected mode 530 and the C-DRX is in an off state 520.

When the GW 501 identifies or determines that there is an (imminent) upcoming cellular activity for a known duration, T_BUSY, the GW 501 transmits an immediate release request (RRQ IR) to the engaged EN 502 to inform the EN of an imminently upcoming cellular activity that will be performed for the time period of T_BUSY. While the cellular activity is performed for T_BUSY, the GW 501 will be released from the D2D connected mode and the C-DRX is in an on state 540. Once the cellular activity of known duration is complete and after the time duration of T_BUSY, the GW 501 will return to the D2D connected mode 550 and the C-DRX is in an off state 560.

Figure 6:
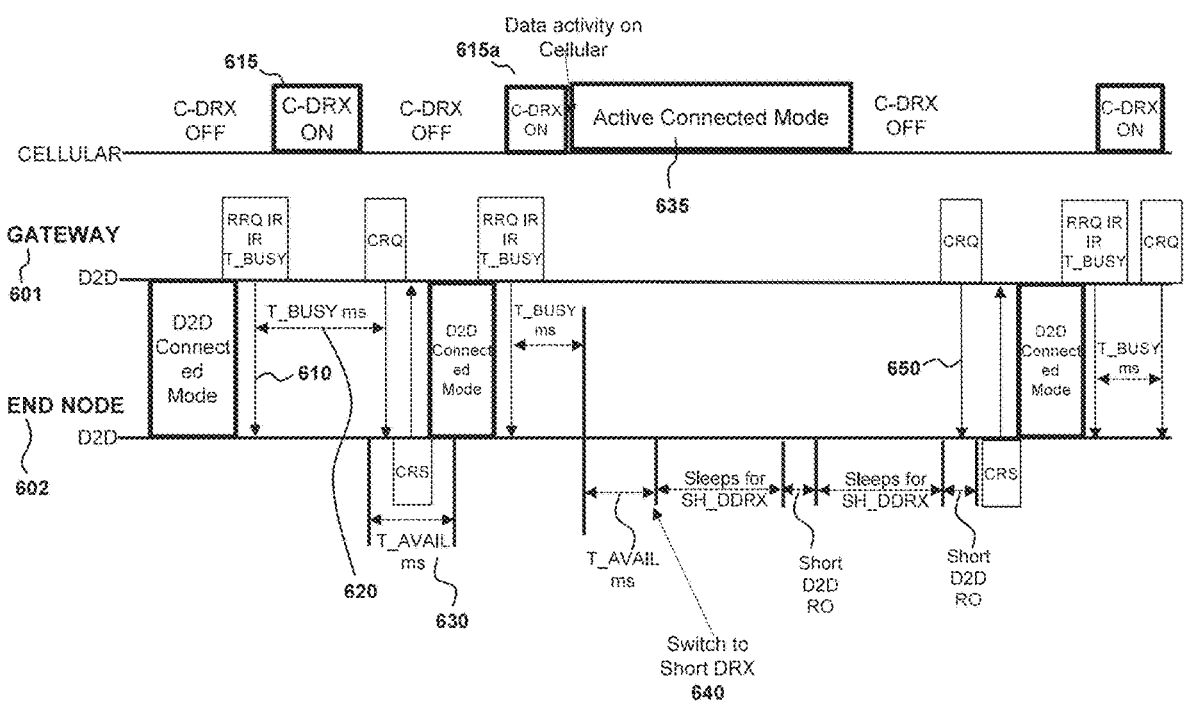
FIG. 6 illustrates an additional procedure to be performed by the EN when the GW transitions from cellular C-DRX (connected mode discontinuous reception (DRX)) back to cellular active, in accordance with embodiments of the present disclosure.

According to embodiments, in the case where the GW goes from cellular C-DRX back to cellular active (e.g. when the GW has data to send to the eNB or when the eNB has data to send to the GW), there is an additional EN procedure to be followed. FIG. 6 illustrates this additional procedure to be performed by the EN when the GW transitions from cellular C-DRX back to cellular active, in accordance with embodiments of the present disclosure.

Referring to FIG. 6, when the GW 601 transitions from C-DRX OFF to C-DRX ON 615, according to the procedures illustrated above, the GW 601 will send 610 the RRQ IR with T_BUSY, and the EN 602 will sleep 620 for T_BUSY and wake up 630 for T_AVAIL. When the GW returns to C-DRX OFF state, the D2D connected state will be established again as explained above. However, during the C-DRX ON 615a period, if the GW 601 needs to transition to the active cellular connected mode 635, there is a further procedure is to be performed by the EN 602. This is because, if the GW transitions from C-DRX ON 615a to Active Connected Mode 635, GW will not be able to send a CRQ within T_AVAIL. If, after T_AVAIL, the EN 602 does not receive a CRQ from the GW 601, the EN 602 transitions 640 into the short D2D DRX (e.g. not exponential back-off). The GW 601 then re-connects after the active connected mode 635 by sending 650 the CRQ during the short D2D RO. In this case, the SH_DDRX is pre-configured or previously signaled.

Figure 7:
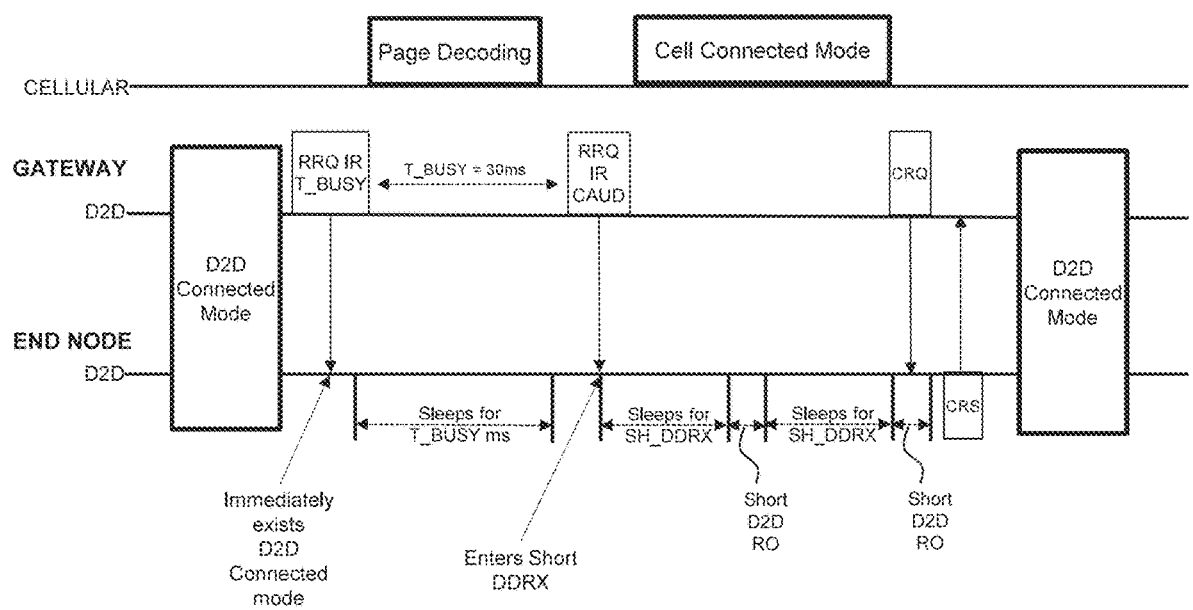
FIG. 7 illustrates a cellular page procedure where a positive page is decoded and the GW needs to go to cell connected mode, in accordance with embodiments of the present disclosure.

According to some embodiments, the D2D connected mode may collide with a positive page (e.g. device terminated cellular data (e.g. mobile terminated (MT) cellular data)) that uses both short and long solutions. When the approximate time needed to decode the page message is known but the page is positive, the GW transitions to the RRC connected mode where the time to service is unknown. This situation can be supported by first transmitting immediate release request with the time duration required to complete the cellular activity (e.g. RRQ_IR with T_BUSY). If the GW is required to transition to the connected mode, the GW will send an immediate release request with a cellular activity of unknown duration (e.g. RRQ_IR with CAUD). An example of a cellular page procedure where a positive page is decoded and the GW needs to go to cell connected mode is illustrated in FIG. 7.

Figure 8:
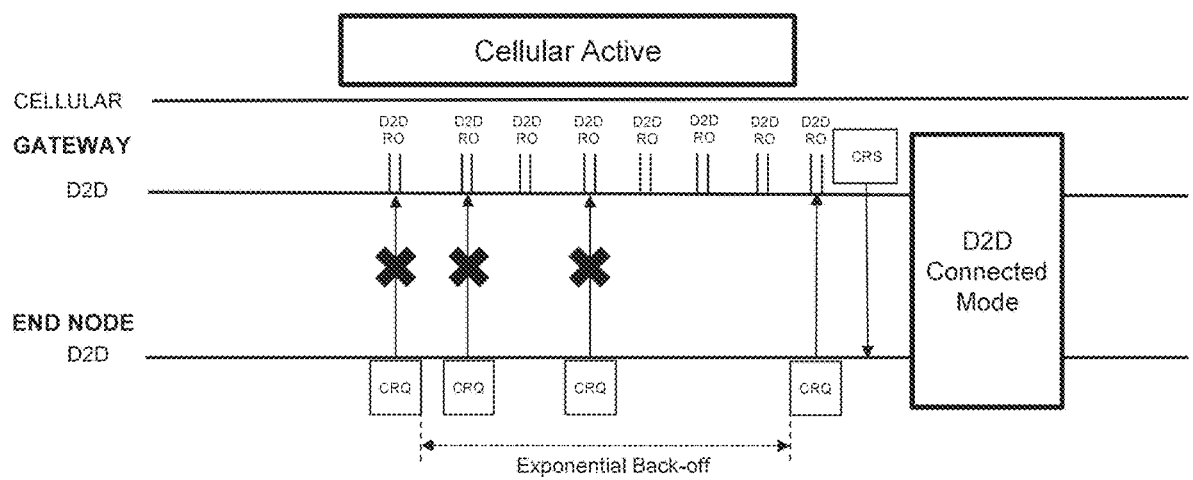
FIG. 8 illustrates a case where multiple sequential access failures occur due to the exponential back-off of the EN.

When an EN wants to engage in active D2D communications (e.g., EN was not in D2D connected mode before and wishes to establish D2D connection with the GW now) while the GW is performing a cellular activity, the EN will not receive a response to its connection requests and therefore will go into exponential back-off which may result in multiple sequential access failures. These sequential failures can cause problems including one or more of wasted spectral resources, delayed transmission time, and the like. Therefore, optimization of the connection access method can be necessary. An example case where multiple sequential access failures occur due to the exponential back-off of the EN is illustrated in FIG. 8.

In order to solve the issue of multiple sequential access failures, in various embodiments, the EN continues decoding for a longer period of time when the duration of the cellular activity is short. This decoding period may be longer than the time that would normally be taken for transmission of a connection response (CRS) (e.g. 10 ms). In some embodiments, the decoding period may be extended by the CRS timeout (CRS_TO) period. During the CRS_TO period, the EN will be searching for a CRS, a D2D available message (DAM) or both. The DAM can be sent by the GW after the cellular activity is complete. In some embodiments, the DAM is a control plane message (e.g. CID) that is broadcasted by the GW and is decodable by any EN. In such cases, the destination ID of the DAM may be a broadcast ID or GW ID. Upon receipt of the DAM, the EN transmits the CRQ to the GW. In order to avoid collision, the EN may randomly delay transmission of the CRQ until after reception of DAM. The transmission of the CRQ may be delayed up to the available time for DAM transmission (DAM_AVAIL), wherein DAM_AVAIL may be predetermined or dynamically signalled.

Figure 9:
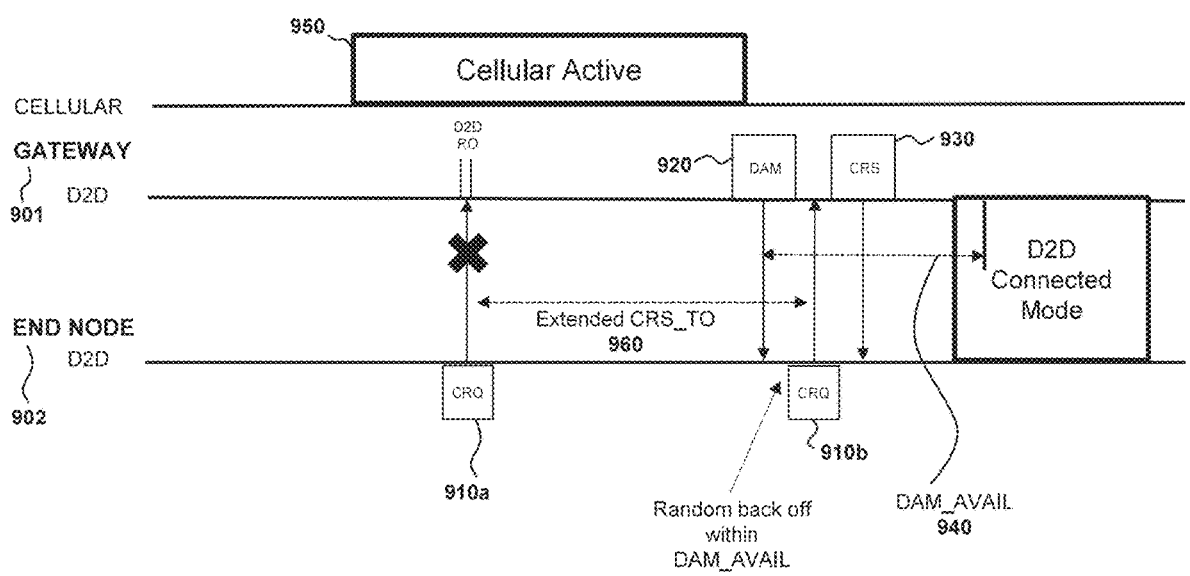
FIG. 9 illustrates a delayed transmission of a connection response when the GW is engaged with a short cellular activity, in accordance with embodiments of the present disclosure.

FIG. 9 illustrates a delayed transmission of a CRS when the GW is engaged with a short cellular activity, in accordance with embodiments of the present disclosure. Referring to FIG. 9, while the GW 901 is performing a short cellular activity 950, the EN 902 will not receive a response (CRS) to the CRQ 910a due to the GW 901's cellular activity. When the cellular activity 950 is complete, the GW 901 sends (e.g. directly transmits or broadcasts) the DAM 920 to the EN 902. Upon receipt of the DAM 920, the EN 902 transmits the CRQ 910b to the GW 901. The transmission of the CRQ 910b is delayed by the extended CRS_TO 960, as illustrated in FIG. 9. While the transmission of the CRQ 910b can be further delayed (e.g. transmission is randomly backed off), the CRQ 910b can be sent within the identification of the DAM_AVAIL 940. Upon receipt of the CRQ 910b, the GW 901 sends the CRS 930 to the EN 902.

The delayed transmission of the CRQ illustrated above (e.g. procedure illustrated in FIG. 9) may not be optimal with respect to power consumption, especially when the active cellular communication is long. When the CRS_TO is set to be too long, excessive battery drain can be caused as the EN keeps decoding for a longer period of time. To resolve this issue, in various embodiments, the EN goes into a power efficient short DRX mode after the time period of the CRS_TO, as illustrated in FIG. 10.

The following procedure is performed when the GW is in active connected mode for a longer period of time, for example longer than the CRS_TO. According to some embodiments, the short DRX used by the EN is based on the GW's ID (e.g. GW RNTI) and the period is based on the GW's short D2D DRX cycle (e.g. GW's SH_DDRX) and the RO is based on the GW's ID (e.g. GW RNTI). The GW's SH_DDRX can be pre-configured or signaled (for example dynamically) to the EN during an earlier D2D communication. The DAM is sent, by the GW during GW RO based on the GW's ID and SH_DDRX, after the cellular activity is complete. In some embodiments, the DAM is a control plane message (e.g. CID) that is broadcasted by the GW and is decodable by any EN. In such cases, the destination ID of the DAM may be a broadcast ID or GW ID. Upon receipt of the DAM, the EN transmits the CRQ to the GW. In order to avoid collisions, the EN may randomly delay transmission of the CRQ after reception of DAM. The transmission of the CRQ may be delayed up to the available time for DAM transmission (DAM_AVAIL). The remaining steps are substantially similar as those in the procedure where the GW is engaged with a short cellular activity, as illustrated above.

Figure 10:
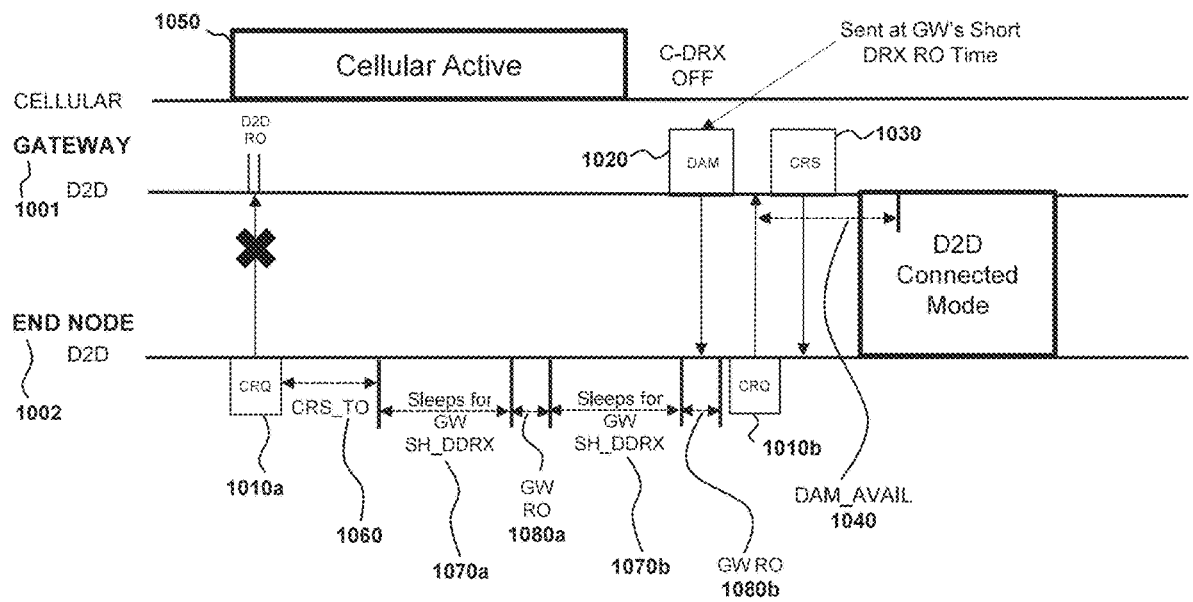
FIG. 10 illustrates a delayed transmission of a connection response (CRS) when the GW is engaged with a long cellular activity, in accordance with embodiments of the present disclosure.

FIG. 10 illustrates a delayed transmission of a CRS when the GW is engaged with a long cellular activity, in accordance with embodiments of the present disclosure. Referring to FIG. 10, while the GW 1001 is performing a long cellular activity 1050, the EN 1002 will not be able to receive a CRS response to the CRQ 1010a due to the GW's 1001 cellular activity. As stated above, the DAM 1020 can be transmitted during GW RO.

After the CRS_TO 1060, the EN 1002 sleeps for the GW's 1001 short D2D DRX cycle, the SH_DDRX 1070a. The EN 1002 wakes up during the GW's 1001 RO 1080a. As the cellular activity 1050 is not completed during the RO 1080a and since the GW has not sent DAM, the EN 1002 sleeps again for the SH_DDRX 1070b. When the EN 1002 wakes up again, at this time the cellular activity 1050 is complete. As such, the GW 1001 can send (e.g. directly transmit or broadcast) the DAM 1020 to the EN 1002 during the RO 1080b. Upon receipt of the DAM 1020, the EN 1002 transmits the CRQ 1010b to the GW 1001. Put another way, the transmission of the CRQ 1010b is delayed until the EN 1002 receives the DAM 1020. While the transmission of the CRQ 1010b can be further delayed (e.g. transmission is randomly backed off), the CRQ 1010b is sent within the DAM_AVAIL 1040. Upon receipt of the CRQ 1010b, the GW 1001 sends the CRS 1030 to the EN 1002.

Figure 11:
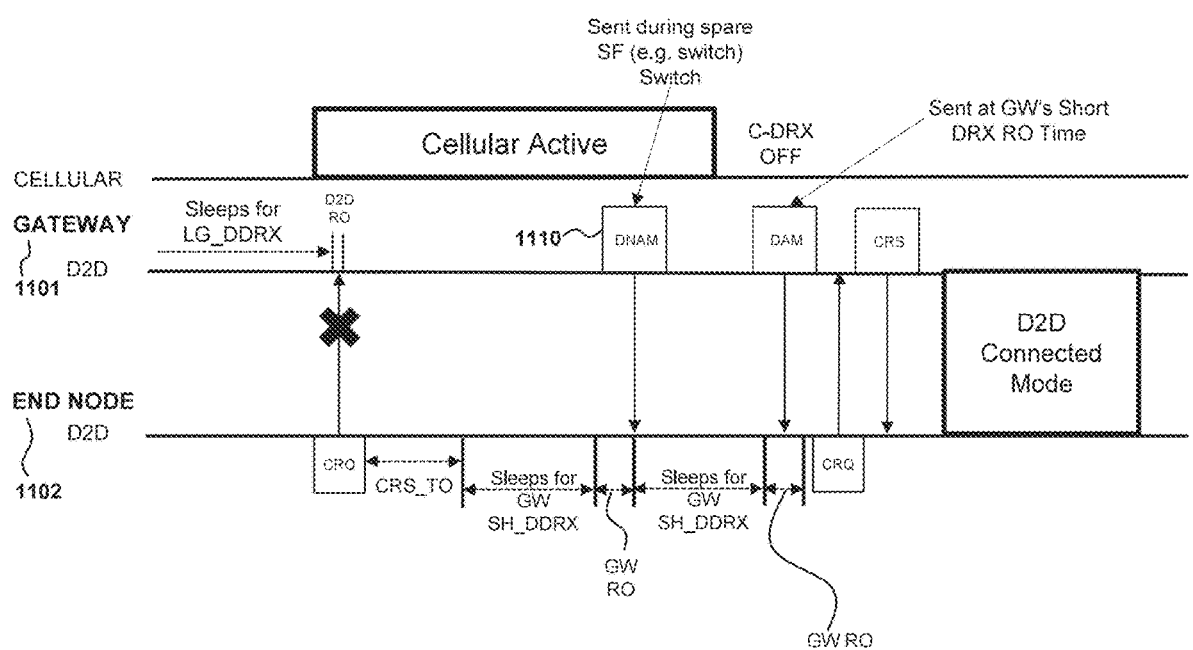
FIG. 11 illustrates a delayed transmission of a CRS when the GW is engaged with a long cellular activity, in accordance with embodiments of the present disclosure.

An alternative example of the delayed transmission of a CRS when the GW is engaged with a long cellular activity is illustrated in FIG. 11, in accordance with embodiments or the present disclosure. As illustrated in FIG. 11, in some embodiments, the GW 1101 can send a broadcast control plane message indicating that it is busy. For example, the 'D2D Not Available Message (DNAM)' 1110 can be sent by the GW 1101 to the EN 1102, after each of the GW's 1101 long ROs. Upon reception of the DNAM 1110, the EN 1102 goes into short DRX mode and therefore sleeps for a predetermined period of time (e.g. the GW 1101's SH_DDRX). The remaining steps are substantially the same as those in the procedure illustrated above and in FIG. 10 for cases where the GW is engaged with a long cellular activity.

The DNAM message (which is a control plane message) is sent using a spare SF during the active cellular communication (e.g., using a switch SF). Thus the active cellular communication remains uninterrupted and the EN also gets notified that the GW is currently not available for D2D communication.

According to embodiments, an alternate way of suspending D2D activity during cellular activity is by changing the way the D2D time resources are allocated during cellular activity. In most D2D protocols, time slots for transmission between a GW and an EN are assigned in a fixed scheduling pattern. For example, a time slot is assigned for transmission from a GW to an EN and a different time slot is assigned after a beacon for transmission from the EN to the GW. For example, time slots for transmission between a GW and an EN are assigned in a time division duplex (TDD) pattern. However, such rigid time resource allocation is not applicable while the GW is performing cellular activity, as the time slots or subframes, which are available for D2D transmission (e.g. switch subframes and decoding subframes), are dynamic. To resolve this problem, according to embodiments, the GW allocates resources dynamically to the EN. Dynamic resource allocation is possible because the GW determines when time resources can be allocated for D2D communications. In various embodiments, the GW transmits control plane messages to the EN in order to indicate which scheduling mode EN should be in (e.g. dynamic scheduling mode (DSM) or fixed scheduling mode (FSM)), as illustrated in FIG. 12.

Figure 12:
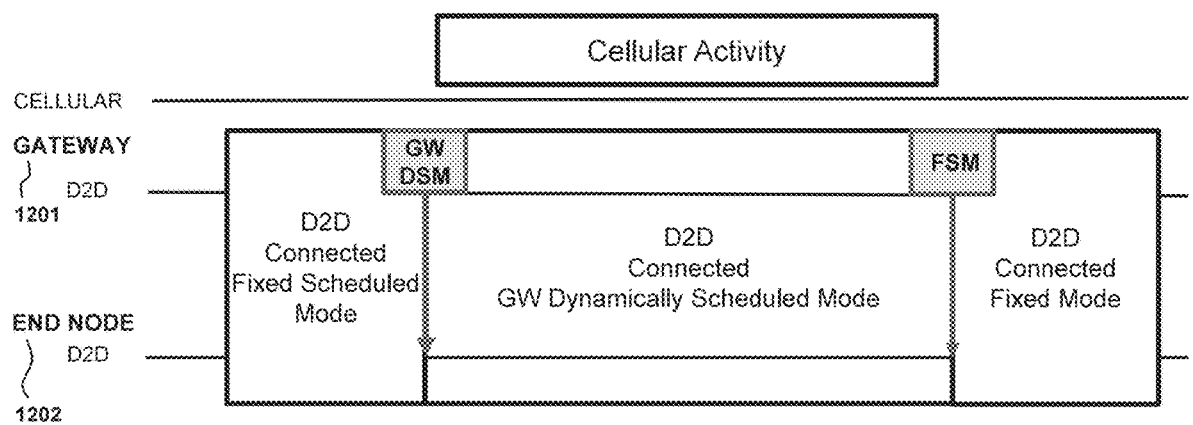
FIG. 12 illustrates transmission of control plane message indicative of the scheduling mode of the GW, in accordance with embodiments of the present disclosure.

FIG. 12 illustrates an example transmission of control plane message indicative of the scheduling mode of the GW, in accordance with embodiments of the present disclosure. After the GW 1201 switches the EN 1202 to DSM, the EN 1202 does not transmit until the GW 1201 allocates time resources to the EN 1202. The resource allocations can be sent to the EN 1202 via a control plane message such as a scheduling indication (SI). The SI indicates which time resources (e.g. time slots) in the future the EN 1202 will use. As only a few bits of data can be required to indicate the time resources that the EN 1202 shall use, the SI indication can be included within a D2D grant message (e.g. CID message) in order to save on signaling resources. In some embodiments, the GW 1201 may not be able to precisely predict the time resources that the EN 1202 can use, and therefore the GW 1201 indicates more than one time resource for the EN 1202 in the SI. In such cases, the EN 1202 can repeat the same transmission on all time resources indicated in the SI. The time resources that the EN 1202 can use may be predicted based on the cellular protocol.

In LTE-M (or NB-IOT (narrowband internet of things)), D2D traffic can be transmitted at least during "switch" subframes. In other words, a switch SF is a SF used to allow a half duplex frequency division duplex (HD-FDD) radio to switch from uplink (UL) to downlink (DL) or from DL to UL (e.g. switching between acting as a transmitter and a receiver). The GW can predict when a switch SF is present by examining the cellular grants that it receives. In LTE-M (and NB-IOT), there are predetermined delays between grants, data and acknowledgments (ACKs).

Figure 13:
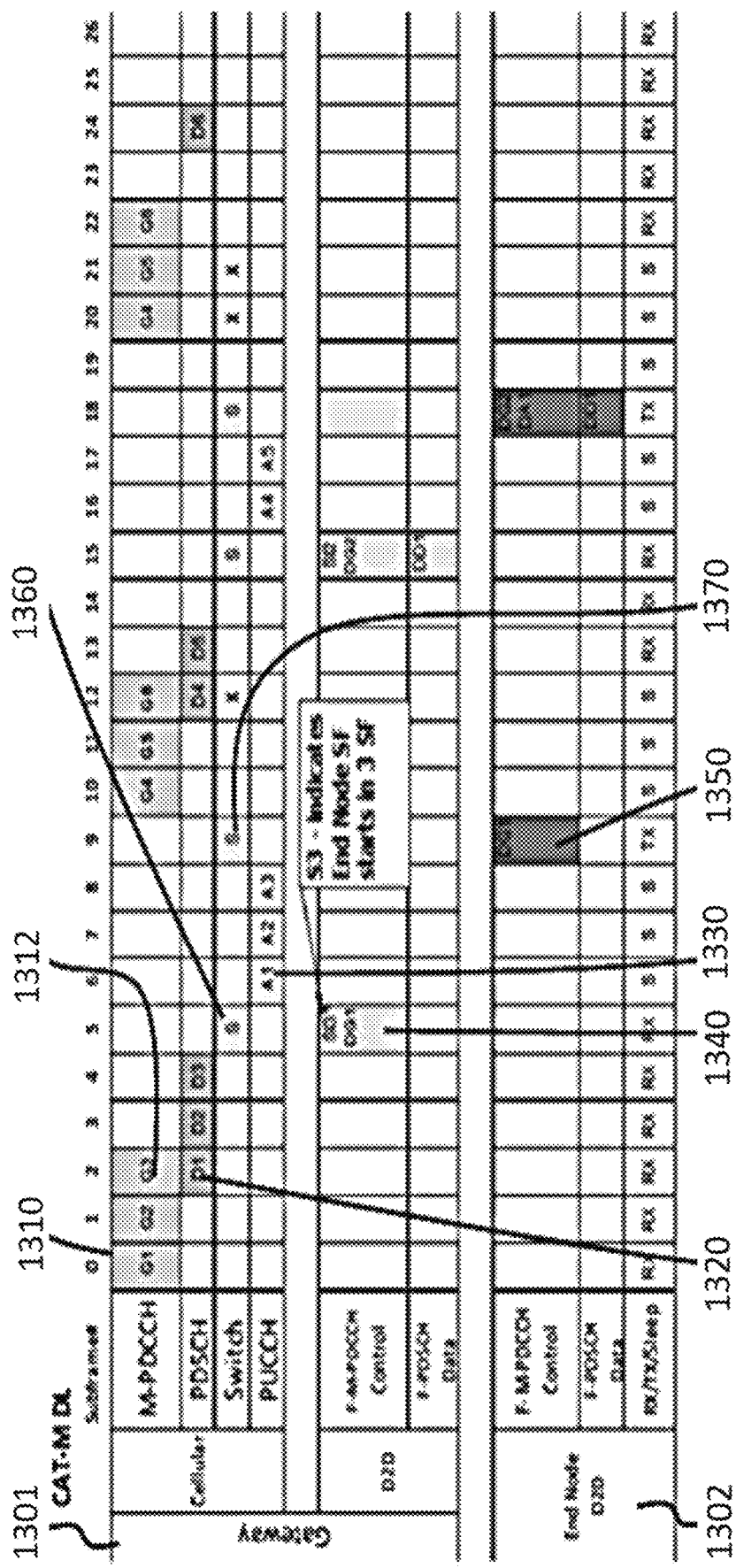
FIG. 13 illustrates a dynamic scheduling mode (DSM) in LTE-M downlink (DL) traffic, in accordance with embodiments of the present disclosure.
Figure 13:
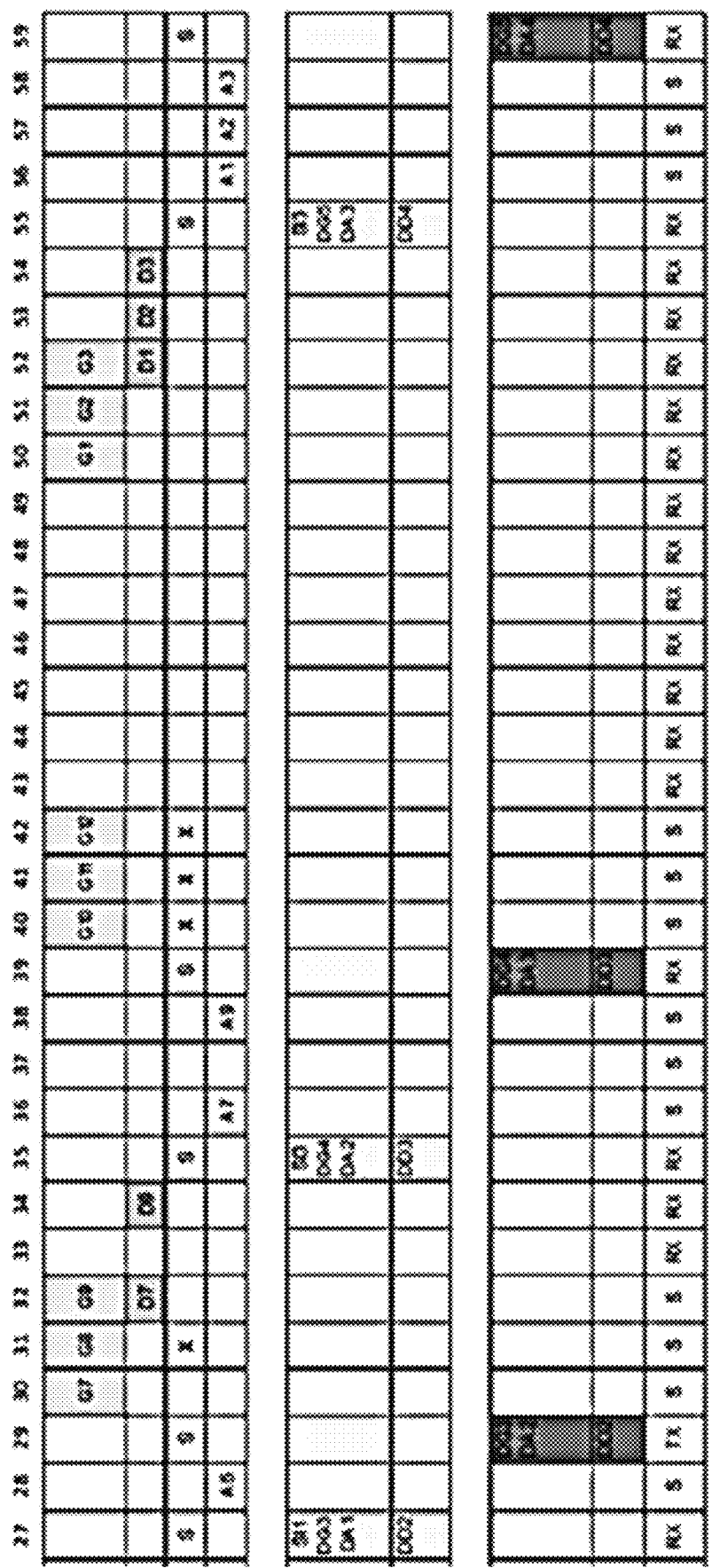

FIG. 13 illustrates an example of dynamic scheduling mode (DSM) in LTE-M DL traffic, in accordance with embodiments of the present disclosure. It should be readily understood that a similar technique or method can also be applied to other cellular technologies and this is not limited to LTE-M. Referring to FIG. 13, a DL grant, G1 1310, allocates DL resources for data, two SFs ahead of DL data (e.g. D1 1320). The UL ACK, A1 1330, can be transmitted four SFs after the DL data. Provided that the DL grant, G1 1310, is received at SF #0, data is in SF #2 and the UL ACK, A1 1330, is transmitted in SF #6. Therefore, the first switch SF, S 1360, will be present in SF #5. Using these timing relations, when the GW 1301 receives the third grant, G3 1312, in SF #2, the GW 1301 can predict the second switch SF 1370 will be present in SF #9. Upon prediction, the GW 1301 sends a SI (e.g. SI3 1350), which indicates resource allocation, to the EN 1302 in SF #5, four SFs ahead of SF #9. After decoding the SI (e.g. SI3 1350), the EN 1302 can then perform D2D transmission in SF #9 to the GW 1301 (e.g. DG1 1350).

Figure 14:
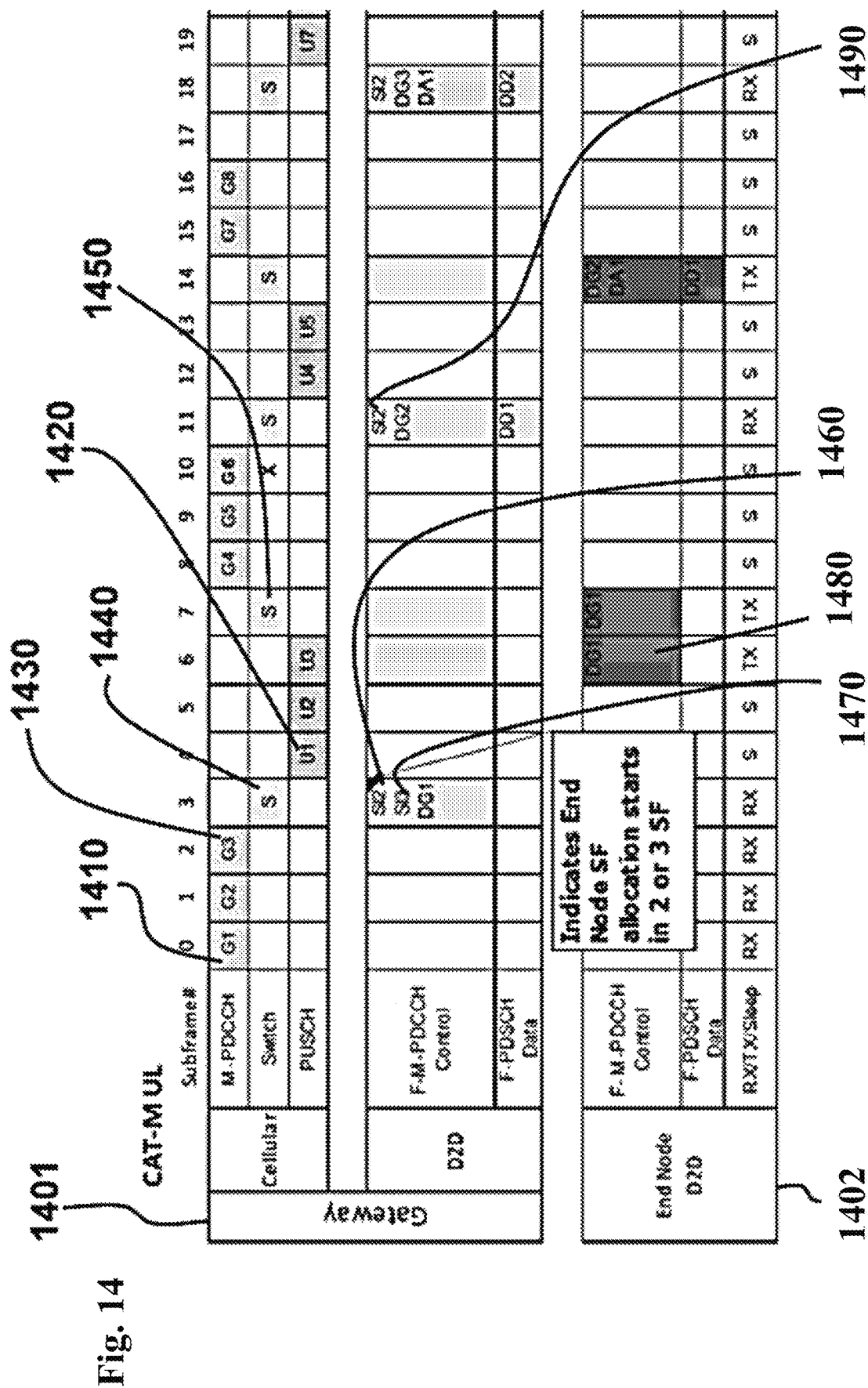
FIG. 14 illustrates DSM in LTE-M uplink (UL) traffic, in accordance with embodiments of the present disclosure.

The procedure is similar to a case when UL traffic is sent using cellular communications, as illustrated in FIG. 14. FIG. 14 illustrates an example of dynamic scheduling mode (DSM) in LTE-M UL traffic, in accordance with embodiments of the present disclosure. Referring to FIG. 14, a UL grant, G1 1410, allocates UL resources for data four SFs ahead (e.g., U1 1420) at SF #4. The UL grant, G1 1410, is received in SF #0. In other words, data is sent in SF #4 and therefore the first switch SF, S 1440, is provided in SF #3. After the third grant, G3 1430, is decoded, the GW 1401, knows the second switch SF, S 1450, is present in SF #7. However, if decoding is delayed, the GW 1401 may not be able to determine when the second switch SF, S 1450, will be present for example until the middle of SF #3, which can be late for signalling to be sent the EN 1402. To resolve this issue, the GW 1401 sends a SI (e.g. SI2 1460 and SI3 1470), which indicates resource allocation, to the EN 1402 in SF #3. The SI2 1460 and SI3 1470 are transmitted three and four SFs ahead of SF #6 and SF #7, respectively, which are the subframes for transmission of the D2D message. After decoding the SI2 1460 and SI3 1470, the EN 1402 transmits its D2D message (e.g. DG1 1480) in both SF #6 and SF #7. Although this does waste some transmission power, it allows some D2D traffic to be sent. If the EN 1402 does not want to duplicate its transmission, it can autonomously decide to wait for a single SI (e.g. SI2 1490 in SF #11).

Figure 15:
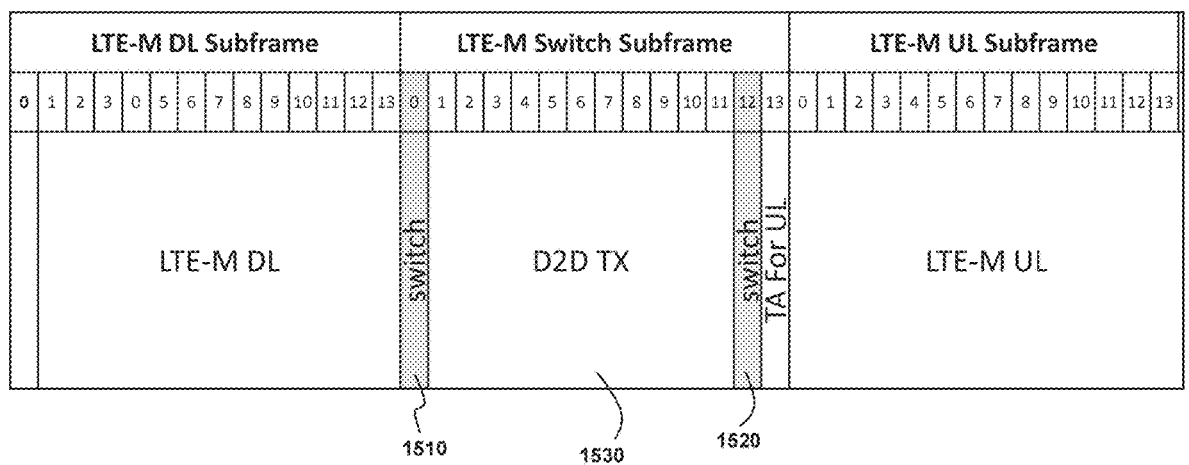
FIG. 15 illustrates a D2D transmission in LTE-M switch SF, in accordance with embodiments of the present disclosure.

FIG. 15 illustrates an example of D2D transmission in LTE-M switch SF, in accordance with embodiments of the present disclosure. In LTE-M, a switch SF (e.g. switch SFs 1510 and 1520) is 1 millisecond long and includes 14 symbols, as illustrated in FIG. 15. If the HD-FDD radio can switch within 1 symbol (~71 psec), the D2D traffic can be sent (e.g. D2D TX 1530) in 11 symbols (~780 psec).

For NB-IoT, switching times and scheduling delays are longer than those of LTE-M. Therefore, the HD-FDD radio switches slower than in LTE-M.

Those skilled in the art would readily understand that the above LTE-M techniques for determining when future resources are available for D2D transmission are applicable to other cellular protocols such as narrow band IOT (NB-IOT), LTE or new radio (NR).

If a D2D EN attempts to connect with a GW during GW RO when the GW is in an active D2D communication with another EN, this connection request will fail and the EN will execute exponential back-off which may result in multiple sequential access failures.

Figure 16:
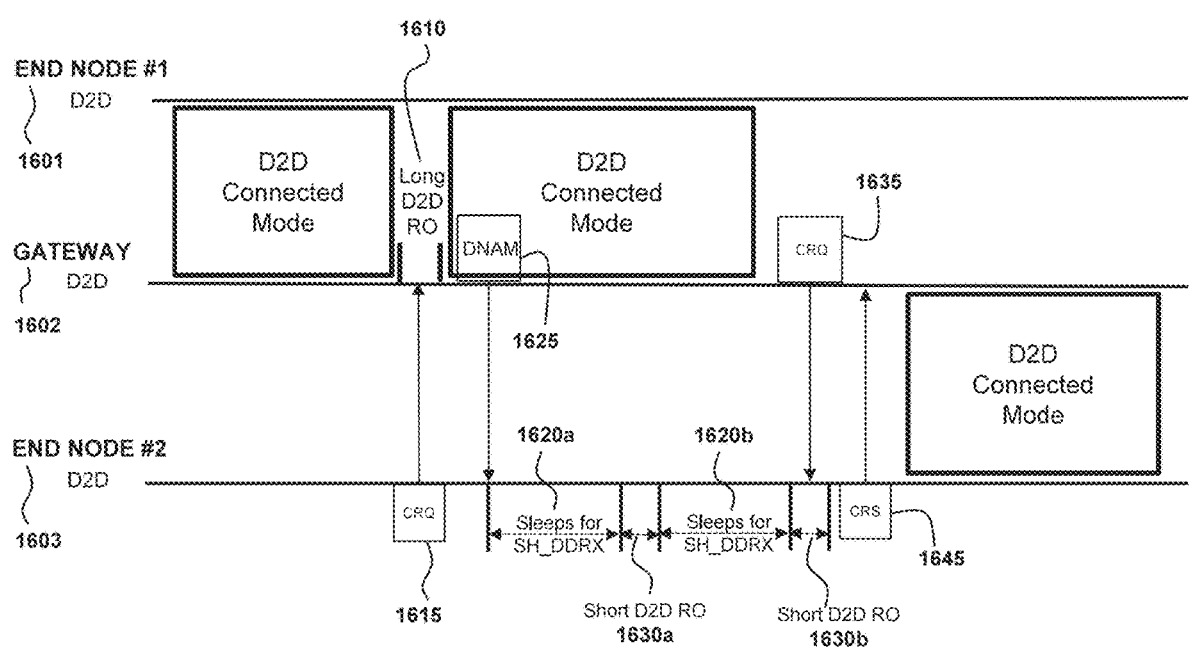
FIG. 16 illustrates processing an EN's connection request when the receiving GW is in active D2D connection mode with another EN, in accordance with embodiments of the present disclosure.

FIG. 16 illustrates an example of processing an EN's connection request when the receiving GW is in active D2D connection mode with another EN, in accordance with embodiments of the present disclosure. Referring to FIG. 16, while in active communication with the GW 1602, the EN 1601 does not transmit during the GW's long D2D RO 1610. This allows the GW 1602 to decode CRQ(s) from other ENs (e.g. EN 1603) if received. If the GW 1602 identifies the CRQ 1615 received from the EN 1603, the GW 1602 can respond to the EN 1603 with a control plane message (e.g. D2D Not Avail Message (DNAM) 1625) to indicate its in a busy state.

Upon decoding the DNAM 1625 that the EN 1603 receives in response to the CRQ 1615, the EN 1603 goes into short D2D DRX mode and sleeps for short D2D DRX cycle, the SH_DDRX 1620a. The EN 1603 wakes up during the short D2D RO 1630a and waits for the CRQ 1635 to be receive from the GW 1602. However, as the GW 1602 is still in D2D connected mode (e.g. the GW 1602 is still actively communicating with the EN 1601), the EN 1603 does not receive the CRQ 1635 during this time period and sleeps again for the SH_DDRX 1620b. When the EN 1603 wakes up again during the short D2D RO 1630b, the active communication between the EN 1601 and the GW 1602 is completed, and therefore the EN 1603 receives the CRQ 1635 from the GW 1602. In response, the EN 1603 transmits the CRS 1645 to the GW 1602.

While not specifically illustrated in FIG. 16, in some embodiments, if a GW (e.g. GW 1602) receives a connection request from more than one EN (e.g. multiple CRSs from multiple ENs) while in active communication with an EN (e.g. EN 1601, EN 1603), the GW can queue these requests, and service each EN in order of a certain priority (e.g. first come, first served or EN importance or the like).

The following illustrates an example set of procedures for resolving collision issues, for example when one type of communication (e.g. cellular activity) occurs to a device (e.g. GW) while that device is performing the other type of communication (e.g. D2D communication between the GW and EN), in accordance with embodiments of the present disclosure.

According to embodiments, the actions of the GW can be determined based on whether the GW is in D2D connected mode with an EN and whether the duration of the GW's cellular activity is known. If the GW is in D2D connected mode with an EN (e.g. Forte connected mode) and GW has to transition to cellular active mode where the duration of the GW's cellular activity is known, the GW can send a D2D immediate release request (RRQ_IR) with the time duration (or approximation thereof) required to complete the GW's cellular activity (T_BUSY). The time duration required to complete the cellular activity may be determined by the GW. In order to improve reliability, in some embodiments, the GW sends more than one D2D RRQ_IR. After transmitting the RRQ_IR, the GW, with regards to the D2D communication, waits for the T_BUSY to expire. If the cellular activity is complete after T_BUSY, the GW sends a D2D connection request (CRQ) to the previously connected EN to re-initiate the D2D connected mode (e.g. Forte connected mode). If the cellular activity is not complete after T_BUSY, the above procedure may be repeated (e.g. start with sending an RRQ_IR).

If the GW is in D2D connected mode with an EN (e.g. Forte connected mode) and GW has to transition to cellular active mode where the duration of the GW's cellular activity is not known, the GW sends a D2D immediate release request (RRQ_IR) with the data indicative of an imminently upcoming cellular activity with an unknown duration (e.g. CAUD). In some embodiments, the RRQ_IR optionally further contains the data indicative of the short D2D DRX cycle (e.g. SH_DDRX). After transmitting the RRQ_IR, the GW, with regards to the D2D communication, waits for completion of the cellular activity. When the cellular activity is complete, the GW sends a D2D connection request (e.g.

Forte CRQ) to previously connected EN at short D2D DRX RO (e.g. short Forte DRX) in order to re-initiate the D2D connection with the EN.

If the GW is not in D2D connected mode with an EN (e.g. Forte idle mode or Forte long DRX) and the GW is engaged in cellular activity, there will not be a D2D reception opportunity (e.g. Forte RO) due to the GW's cellular activity, which would result in collisions with D2D reception opportunity. In this case, the GW will wait for the cellular activity to be completed. If the duration of the cellular activity is shorter than the CRS timeout (CRS_TO), the GW will send a D2D available message (DAM) immediately after the cellular activity is completed. If the duration of the cellular activity is equal to or longer than the CRS_TO, then the GW will send a DAM during the first RO of the short DRX, after the cellular activity is completed.

According to embodiments, the actions of the EN would be determined based on whether the EN is in D2D connected mode with the GW and whether the EN receives the known duration of the GW's cellular activity. If the EN is in D2D connected mode with the GW and receives a D2D immediate release request (RRQ_IR) (e.g. Forte RRQ-IR) with the time duration (or approximation thereof) required to complete the GW's cellular activity (T_BUSY), the EN immediately exits from the D2D connected mode (e.g. Forte connected mode). Then, the EN goes to sleep for T_BUSY. After T_BUSY, the EN wakes up and listens for a D2D connection request for a pre-determined period (T_AVAIL). T_AVAIL may be included in the RRQ_IR or dynamically signalled. If the D2D connection request (e.g. Forte CRQ) is received within the T_AVAIL, then the EN sends a D2D connection response with an acceptance of the connection request (e.g. Forte CRS with accept) to re-establish the D2D connected mode (e.g. Forte connected mode). If the D2D connection request (e.g. Forte CRQ) is not received within the T_AVAIL and a D2D available message (DAM) is received, the EN may randomly back off the procedure up to the available time for DAM transmission (DAM_AVAIL). Put another way, the EN may randomly delay transmission of a D2D connection request (e.g. Forte CRQ) up to DAM_AVAIL in order to re-establish the D2D connected mode (e.g. Forte connected mode). If the D2D connection request (e.g. Forte CRQ) is not received within the T_AVAIL and a D2D available message (DAM) is not received, but a D2D immediate release (e.g. Forte RRQ-IR) is received, then the EN can re-start the procedure with an assumption that the EN is in the D2D connected mode (e.g. Forte connected mode). In other words, the EN re-starts the process. If nothing is received within the T_AVAIL (e.g. the D2D connection request (e.g. Forte CRQ), a D2D available message (DAM) and a D2D immediate release (e.g. Forte RRQ-IR) are not received, the EN enters into a short D2D DRX mode (e.g. short Forte DRX). Upon the short D2D DRX timeout (e.g. short Forte DRX timeout), the EN re-initiates connection access procedures, as illustrated above or elsewhere in the present disclosure.

According to embodiments, if the EN is in D2D connected mode with the GW and receives the RRQ_IR with the data indicative of an imminently upcoming cellular activity with an unknown duration (CAUD) instead of the RRQ_IR with T_BUSY, the EN enters into a short D2D DRX mode (e.g. short Forte DRX). Upon the short D2D DRX timeout (e.g. short Forte DRX timeout), the EN re-initiates connection access procedures, as illustrated above or elsewhere in the present disclosure.

According to embodiments, during the GW's D2D reception opportunity (e.g. Forte RO), if the D2D connected EN is configured by higher layers (e.g. components in higher layers), the EN will not transmit to the GW during the GW's Long DRX D2D RO.

It may be noted that the short D2D DRX timeout (e.g. short Forte DRX timeout) can a predetermined time period (e.g. preconfigured and/or dynamically signaled). When the EN enters into a short D2D DRX mode, this timeout period can be activated. After the expiry of this timeout period, the EN can go into one or both of exponential back-off and re-initiate connection access procedures, as illustrated above or elsewhere in the present disclosure.

According to embodiments, the GW is able to transmit a release request (RRQ) and transition to the active cellular connected mode before cellular operation is started. The procedures illustrated above with a known cellular activity duration would not cause the GW to delay the cellular activities, as the duration of the cellular activity, tracking area update (TAU) and system information block (SIB) are known in advance. For device terminated data (e.g. response to a positive page message), the device (e.g. GW etc.) can initiate a RRC connection in a timely manner. However, there is no strict cellular requirement (e.g. <100 ms). For device originated data, there is no defined cellular timing requirement however latency can result if there is a delay in the transmission of a RRQ and transition from the D2D connected mode to the active cellular connected mode. In various embodiments, hard timing requirement for transmission of RRQ and transition from the D2D connected mode to the active cellular connected mode is typically not required. However, generally it can be considered that a time period of <100 ms may be desired.

Forte Polite Spectrum Access (PSA)

It is understood that the 863-870 MHz unlicensed frequency range is an important band for use of D2D, as it is unlicensed and is a relatively low frequency band compared to other unlicensed bands (e.g. 2.5 GHz). These frequency ranges (e.g. 863-870 MHz) are also within the cellular bands. Therefore, most IoT cellular modules can support these frequency ranges without any additional hardware (e.g. low-noise amplifier (LNA)/power amplifier (PA)). However, for example in Europe, the use of this frequency range (863-870 MHz) is tightly regulated. Regulation items includes device category, start and end frequency of bands defined within the 863-870 MHz frequency range, signal bandwidth, transmit power, duty cycle and spectrum access.

For example, pursuant to the duty cycle regulations, the cumulated sum of air transmission time of a device during an observation period (for example listening period or the ON period of the device) may be restricted to e.g., one hour within a specific frequency band. Duty cycle restrictions can be relaxed in the case of polite spectrum access (PSA). PSA is a technique to access spectrum and mitigate interference by employing a clear channel assessment (CCA). PSA encompasses a listen before transmit (LBT) mechanism to which a device applies a clear channel assessment (CCA) before transmission. The CCA is a mechanism for determining whether the band is idle or not. To be considered "idle", the signal strength within the frequency band needs to be below a threshold for a certain period of time.

In light of the duty restrictions, there are problems when transmitting data via unlicensed frequency bands. In the case of transmission without PSA, the duty cycle restrictions apply to an entire band defined in the frequency range of 863-870 MHz. For example, Band 47 spans from 865 MHz to 868 MHz and is subject to a 1% duty cycle. If a system uses, for example, two 200 KHz signals within the ranges from 865.0 MHz to 865.2 MHz and from 866.0 to 866.2

MHz, the 1% duty cycle restriction applies to the aggregated traffic over those two frequency ranges. This can limit the overall traffic that can be migrated in the band.

Moreover, the PSA illustrated in the European norm ETSI EN 300 220-1, hereinafter referred to as ETSI document, has a minimum off-time parameter that requires a transmitter to remain off after a transmission on the same operating frequency for 100 milliseconds. This can lead to unacceptable transmission gaps for devices. For example, if a D2D side link (SL) protocol operates in active cellular transmission, the devices can use only intermittent transmission opportunities for D2D SL communication. The transmission opportunities can be scarce and typically less than 100 milliseconds apart.

Other technologies operated in the 863-870 MHz frequency range in Europe such as SigFox™ and LoRa™ assume that traffic can be accommodated under the duty cycle restrictions. For example, Band 54, which permits a 10% duty cycle, is used for downlink (DL) transmission and Band 48, which permits a 1% duty cycle, is used for uplink transmission. This can account for the traffic imbalance among individual uplink and downlink transmitters in a star network architecture. However, Band 54 is only 250 kHz wide, and therefore data transmission is significantly limited. Moreover, it is predicted that the duty cycle restrictions will become further stringent due to higher traffic demands by applications (e.g. mobile applications).

According to the ETSI document, the PSA permits a maximum duty cycle of 2.78% per 200 kHz. A frequency agile system using multiple 200 kHz portions of the frequency spectrum can increase the aggregate duty cycle, for example to 41.6% in a 3 MHz band. However, there is no solution of how to accommodate primary sub-bands and secondary sub-bands with different signal bandwidths associated with different data rate demands. Primary sub-bands may include additional information (e.g., one or more of D2D sync signals, spectrum configuration, configuration of secondary sub-bands, control information and data) and such additional information may not be present in the secondary sub-bands.

PSA with Dynamic Bandwidth

Division of the frequency band into smaller sub-bands is a method for increasing the duty cycle (=number of sub-bands×2.78%). However, while many factors can affect the size and the number of the sub-bands, it is unclear how to determine the optimal size and the number of the sub-bands. It is also unclear how these sub-bands can operate within a device that supports both D2D communication and cellular communications.

According to embodiments, the polite spectrum access (PSA) is utilized with network-wide synchronized frequency agility that is adjusted to the requirements of primary and secondary sub-bands. The minimum granularity is a bandwidth B, the bandwidth used to define the duty cycle for PSA. For example, in accordance with the European standard provided in the ETSI document, the bandwidth B may be 200 kHz. The successive transmissions from the same device may respect the required off-time, Toff. For example, in accordance with the European standard provided in the ETSI document, Toff may be 100 milliseconds.

In various embodiments, the transmitting device switches between operating bands and transmitting signals in different bandwidths in order to achieve the desired data rates (short-term target) and maximize the effective duty cycle (long-term target).

Figure 17:
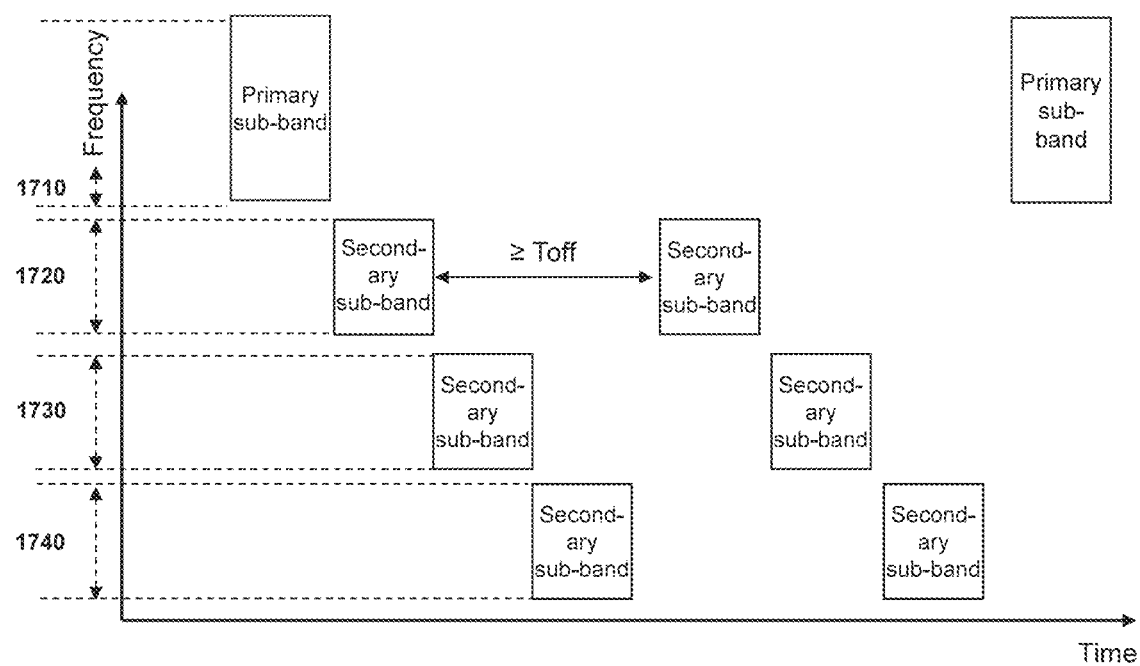
FIG. 17 illustrates different bandwidths for primary sub-bands and secondary sub-bands determined based on the requirements, in accordance with embodiments of the present disclosure.

FIG. 17 illustrates an example of different bandwidths for primary and secondary sub-bands determined based on the requirements, in accordance with embodiments of the present disclosure. Referring to FIG. 17, all the sub-bands (e.g., primary and/or secondary sub-bands) may have a minimum bandwidth B that is used to define the duty cycle for PSA. In some embodiments, the minimum bandwidth of the sub-bands may be 200 kHz. According to embodiments, the bandwidth of each sub-band (e.g. primary sub-band 1710 and secondary sub-bands 1720, 1730 and 1740) is determined based on requirements set for that sub-band. Since the requirements are different for each sub-band, the bandwidths may also be different.

In some embodiments, the bandwidths of the secondary sub-bands 1720, 1730 and 1740 are same as illustrated in FIG. 17. In some other embodiments, however, the bandwidths of the secondary sub-bands 1720, 1730 and 1740 can be different from each other, as illustrated in FIG. 18.

Further referring to FIG. 17, each of the secondary sub-bands 1720, 1730 and 1740 has different frequency range. Each of the secondary sub-bands 1720, 1730 and 1740 can be used in turn for data transmission. As such, only one of the secondary sub-bands 1720, 1730 and 1740 will be active at a time, as illustrated in FIG. 17. The secondary sub-bands 1720, 1730 and 1740 can be utilized more than once during the data transmission. However, each usage of the same secondary sub-bands must be separated by at least the required off-time, Toff. For example, the time between the data transmission 1721 and the data transmission 1722 must be greater than the required off-time, Toff. The same applies to data transmissions on other secondary sub-bands 1730 and 1740.

Figure 18:
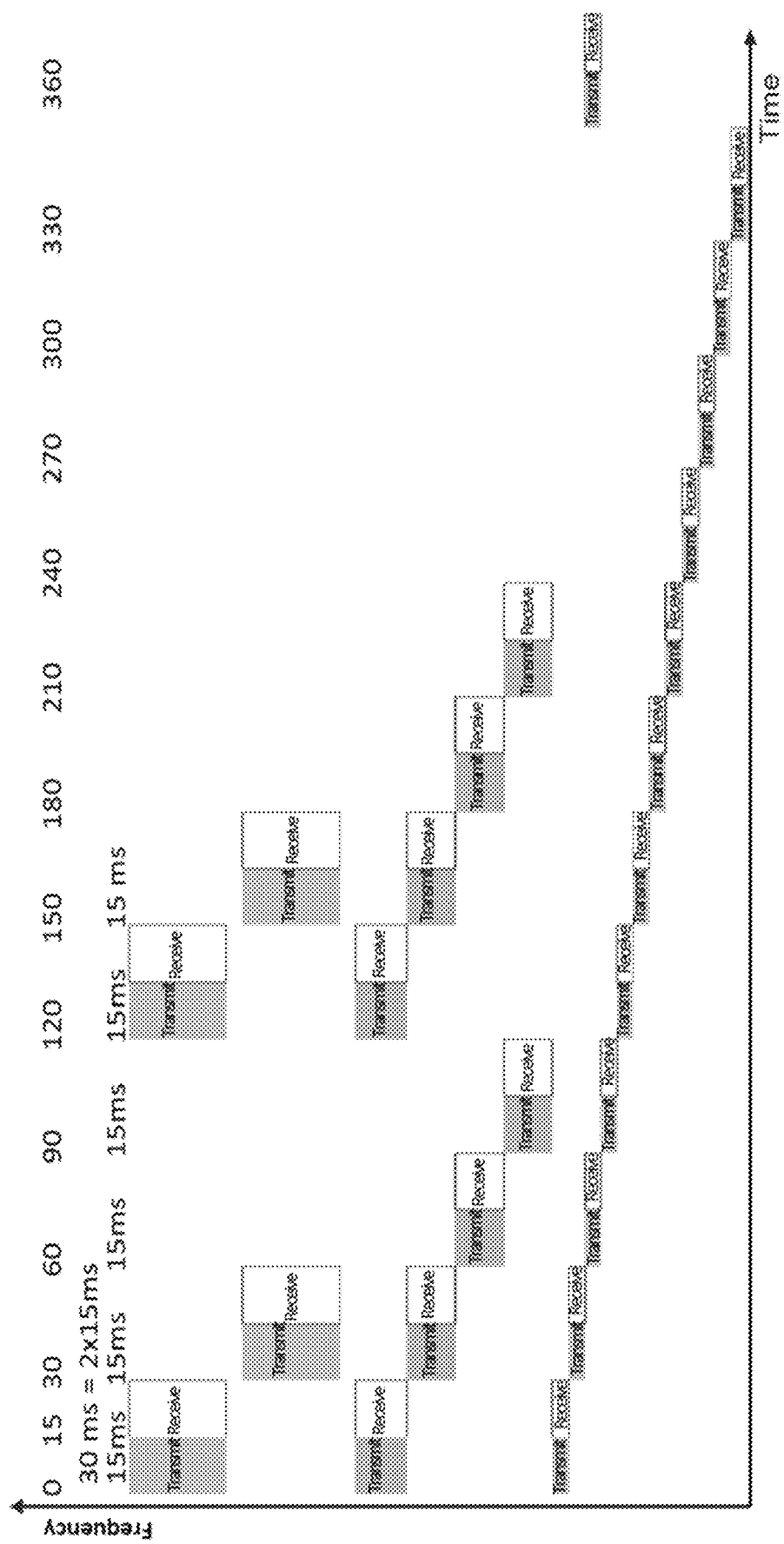
FIG. 18 illustrates effects of different arrangements on performance parameters for data transmission, in accordance with embodiments of the present disclosure.

FIG. 18 illustrates effect of different arrangements on performance parameters for data transmission, in accordance with embodiments of the present disclosure. The data transmission illustrated in FIG. 18 is time-division duplexing (TDD) data transmission using a TDD cycle of 30 milliseconds, a total bandwidth corresponding to 12 physical resource blocks (PRBs), and PSA according to the ETSI document. It should be noted that a 1PRB signal fits into the bandwidth B (i.e. 200 kHz). FIG. 18 provides three arrangements for secondary sub-bands—a secondary sub-band using 6 PRBs, a secondary sub-band using 3 PRBs, and a secondary sub-band using 1 PRB. In FIG. 18, from top to bottom, there are 2 bands (secondary sub-band) using 6 PRBs, 4 bands (secondary sub-band) using 3 PRBs and 12 bands (secondary sub-band) using 1 PRB.

Each of TABLE 1 and TABLE 2 provide example relative peaks and sustained data rates for the three bandwidth options for data signals illustrated in FIG. 18. TABLE 1 is defined for the high SNR case (SNR=5 dB for 6PRB case) and TABLE 2 is defined for the low SNR case (SNR=−15 dB for 6PRB case).

TABLE 1

| Width of Band (PRBs) | Number of Bands | BW reduction Factor | Scheduling efficiency | Peak Activity per Band | Peak Rate | Sustained Activity per Band | Sustained Activity | Sustained Rate |
|---|---|---|---|---|---|---|---|---|
| 6 | 2 | 1.00 | 83% | 12.5% | 0.21 | 2.80% | 6% | 0.05 |
| 3 | 4 | 0.70 | 67% | 12.5% | 0.23 | 2.80% | 11% | 0.05 |
| 1 | 12 | 0.35 | 50% | 4.2% | 0.09 | 2.80% | 34% | 0.06 |

TABLE 2

| Width of Band (PRBs) | Number of Bands | BW reduction Factor | Scheduling efficiency | Peak Activity per Band | Peak Rate | Sustained Activity per Band | Sustained Activity | Sustained Rate |
|---|---|---|---|---|---|---|---|---|
| 6 | 2 | 1.00 | 89% | 12.5% | 0.22 | 2.80% | 6% | 0.05 |
| 3 | 4 | 0.98 | 89% | 12.5% | 0.44 | 2.80% | 11% | 0.10 |
| 1 | 12 | 0.93 | 89% | 4.2% | 0.41 | 2.80% | 34% | 0.28 |

Referring to TABLE 1 and TABLE 2 presented above, the BW reduction factor at a given signal-to-noise ratio (SNR) can be calculated using the formula of $$\text{"}BW \times \log_2\left(1 + \frac{P}{N_0 \times BW}\right)\text{"}.$$

In TABLE 1 and TABLE 2, the BW reduction factor can be determined, using the 6PRB band as a reference, as follows:

$$BW \text{ reduction factor} = \frac{BW \times \log_2\left(1 + \frac{P}{N_0 \times BW}\right)}{\left(6 \times \log_2\left(1 + \frac{P}{N_0 \times 6}\right)\right)}$$

Regarding the scheduling efficiency, in the high SNR case, the scheduling efficiency was calculated with an assumption that 1 PRB is needed to schedule a data packet. In the low SNR case, the scheduling efficiency was calculated with an assumption that 2 slots are needed to schedule a data packet and 16 repeats are needed for the data packet. As a result, an efficiency of 89% (i.e. 16/18) is obtained for all low SNR cases.

Regarding the peak activity per band, the peak activity per band can be defined as the ratio of activity per band defined by a percentage (%).

Regarding the peak rate, the relative peak data rate covers all bands. However, it does not necessarily adhere to the regulatory limitation (i.e. 2.8% per band). The peak rate can be determined using the following equation:

Peak rate=(Number of bands)×(BW reduction factor)×(Scheduling efficiency)×(Peak activity per band)

Regarding the sustained activity per band, the sustained activity per band can be 2.8% per band pursuant to the regulatory requirements.

Regarding the sustained activity, the sustained activity is defined as a percentage (%) indicative of the time of activity in total. The sustained activity can be calculated as 2.8%×(number of bands).

Regarding the sustained rate, the sustained relative data rate covers all bands and adheres to the regulatory limitation (i.e. 2.8% per band). The sustained rate can be determined using the following equation:

Sustained rate=(Number of bands)×(BW reduction factor)×(Scheduling efficiency)×(Peak activity per band)

Further referring to TABLE 1 and TABLE 2 presented above, it is observed that the peak data is better for the 3PRB bands than for the 1 PRB band. However, the sustain rate is better for the 1PRB bands than for the 3 PRB bands. Specifically, in the high SNR case, the peak data is significantly better for the 3PRB bands than for the 1 PRB bands, and the sustain rate is slightly better for the 1PRB bands than for the 3 PRB bands. On the other hand, in the low SNR case, the peak data is slightly better for the 3PRB bands than for the 1 PRB bands, and the sustain rate is significantly better for the 1PRB bands than for the 3 PRB bands. This comparison signifies that one bandwidth is not optimal for all SNR ranges, peak rate requirements or sustained data rate requirement. Therefore, configuration is needed.

In various embodiments, based on the numerical results provided in TABLE 1 and TABLE 2, the optimal configuration can be determined by considering one or more of the followings.

Spectrum transmission rules: Activity per band, time of active durations and transported data depend on the duty cycle and off-time parameters pursuant to the regulation, and all rate results depend on the permitted transmit power.

End node power consumption: Different transmission bandwidths entail different signal processing speeds and therefore different power consumptions. Moreover, different time of active durations entails different aggregate power consumption.

Peak and long term sustained required data rates: Higher transmission bandwidth can increase short-term data rates (Rate per band) but can also result in lower long-term data rates (Transported data).

Average SNR: As the data rate is proportional to $$BW \times \log_2\left(1 + \frac{P}{N_0 \times BW}\right),$$

the data rate gain due to BW would depend on the SNR experienced in the link.

Scheduling efficiency: Scheduling efficiency affects all rate figures. In general, as the amount of spectrum decreases, the scheduling efficiency goes down as scheduling overhead is generally constant.

Cost of device: Limiting transmission and processing to lower-bandwidth configuration can reduce cost of device.

Duplexing protocol (e.g. TDD pattern): The gap between successive transmissions due to regulation (off-time) depends on the duplexing protocol. For example, a shorter TDD cycle leads to a larger gap due to off-time regulation requirement.

As stated above, provided that a device is capable of performing both D2D and cellular transmissions with a single radio, D2D transmission can be bound by spectrum transmission rules (i.e. regulatory rules) which at least include the maximum percent transmission time per frequency range and the minimum off-time after transmission per frequency range.

For effective D2D data transmission (e.g. potential optimal performance) pursuant to the spectrum transmission rules, in various embodiments, the bandwidth of the signaling sub-band (e.g., primary sub-band) is pre-configured, and signaling includes at least synchronization information (e.g. D2D PSS, SSS, PBCH), configuration of other sub-bands, and configuration of duplexing protocol (e.g. TDD). The configuration of other sub-bands (e.g., secondary sub-bands) includes configuring at least one or more of: number of sub-bands, bandwidth (of the sub-bands), time (for example, hopping pattern), and location within the spectrum.

According to embodiments, the configuration of the number of sub-bands and bandwidth of the sub-bands can consider one or more of the followings:

Spectrum transmission rules;
End node power consumption;
Short and long term required data rates;
Average SNR;
Scheduling efficiency;
Cost of device;
Duplexing protocol (e.g. TDD pattern); and
Capacity.

Sub-Band Clear Channel Assessment

The polite spectrum access (PSA) implies performance of the clear channel assessment (CCA). The CCA needs to be performed on the bandwidth B in accordance with the applicable PSA mechanism (e.g. B=200 kHz). Whenever there is a narrow band interferer (e.g. 100 kHz) within the D2D transmission bandwidth (e.g. 1 MHz), the CCA will fail and the D2D transmission will be suspended. This can be considered to be an inefficient use of spectrum.

According to embodiments, the bandwidth used for the CCA does not need to be equal to the bandwidth of the D2D transmission signal. If the transmission bandwidth is larger than bandwidth B (i.e. 200 kHz), for example as illustrated in FIGS. 17 and 18, then the CCA can be performed at the smaller sub-bands B (e.g. 1 PRB). If the CCA fails in one sub-band, that sub-bands can be turned off. For example, in a 3PRB data transmission, 1PRB or 2PRBs where the CCA failed can be turned off. This permits the optimal use of available frequency spectrum with PSA.

In various embodiments, the optimal configuration can be determined considering one or more of the followings.

Spectrum transmission rules: The minimum CCA bandwidth needs to be selected in accordance with the regulated PSA bandwidth.

Transmission bandwidth: The available partial bandwidth for transmission after CCA can be determined based on the total signal transmission bandwidth.

Short and long term required data rates: Suspension of transmission only partially improves short-term data rates, but it affects long-term data rate due to duty cycle restrictions.

Average SNR: The available rate when using only part of the transmission bandwidth can be determined based on the SNR experienced in the link.

Scheduling efficiency: Scheduling efficiency can be affected when using only part of the transmission bandwidth.

As stated above, provided that a device is capable of performing both D2D and cellular transmissions with a single radio, D2D transmission is bound by spectrum transmission rules (i.e. regulatory rules). The transmission rules at least include the maximum percent transmission time per frequency range, the minimum off-time after transmission per frequency range, and the limitation that devices can transmit only after the clear channel assessment (CCA) is successfully performed.

For more effective D2D data transmission (e.g. optimal performance) pursuant to the spectrum transmission rules, in various embodiments, the CCA bandwidth is configured as a sub-band of the maximum D2D transmission bandwidth. As such, the CCA bandwidth is configured to be smaller than the maximum D2D transmission bandwidth. Therefore, multiple CCA sub-bands are processed to cover the maximum D2D transmission bandwidth. In various embodiments, D2D transmission is suspended only for those sub-band frequency ranges where the CCA was not successful. The CCA bandwidth can be optimized in consideration of at least one of more of: spectrum transmission rules, the bandwidth of the signaling sub-band (e.g. bandwidth of each sub-band), data rates required in short and long terms, average signal-to-noise ratio (SNR), and scheduling efficiency.

Hybrid Transmission with and without PSA

When a cellular modem device is in active transmission mode, there are only small sporadic gaps (e.g. 1 millisecond) that can be used for D2D transmission. With the PSA off-time requirement (e.g. Toff), the D2D transmission would be suspended after a short transmission for a longer period of time. For example, the D2D transmission is suspended for 100 milliseconds after transmitting only a very small amount of data for 1 millisecond. This can result in a very low D2D data rate.

According to embodiments, the D2D transmission is performed by dividing a physical device into two logical D2D devices. The two logical D2D devices are the device-NPSA (for Non-PSA operation) and the device-PSA (for PSA operation). The two logical D2D devices are time multiplexed based on certain factors.

In some embodiments, the device-PSA is used for D2D transmission when the cellular modem device is in idle mode (i.e. not actively transmitting), in order to make use of the increased duty cycle allowed by PSA. The device-NPSA is used for D2D transmissions when the cellular modem device is in active cellular transmission mode as such usage can avoid the issue of the regulatory off-time imposed by PSA. The device-PSA can be also used to solve other problems illustrated above or elsewhere in the present disclosure.

In some embodiments, if the device-NPSA and the device-PSA operate in the same band (within one band) (e.g. Band 47), the two logical D2D devices may use non-overlapping frequency ranges or overlapping frequencies. If the device-NPSA and the device-PSA operate in different bands (across the bands) (e.g. in Bands 47 and 84), the frequency ranges for these bands are non-overlapping.

As stated above, provided that a device is capable of performing both D2D and cellular transmissions with a single radio, D2D transmission is bound by spectrum transmission rules (i.e. regulatory rules). The spectrum transmission rules at least include two D2D modes. One of the two D2D modes is the PSA mode. In the PSA mode, the spectrum transmission rules at least include the maximum percent transmission time per frequency range, the minimum off-time after transmission per frequency range, and the limitation that devices can transmit only after the clear channel assessment (CCA) is successfully performed. The other mode is the non-PSA mode. In the non-PSA mode, a maximum transmission duty cycle is applied.

In various embodiments, the device can operate in both D2D modes (i.e. PSA and non-PSA modes). In some embodiments, the device alternately operates in the two D2D modes. The two D2D modes may use the same or different regulated bands. The D2D operating mode may be determined based at least on one or more of: the cellular operation mode, spectrum transmission rules, data rates required in short and long terms, and average signal-to-noise ratio (SNR). Regarding the cellular operation mode, the device may operate in PSA mode if the cellular modem device is in idle mode, and operate in non-PSA mode if the cellular modem device is in active cellular transmission mode.

Forte PSA

According to embodiments, the polite spectrum access (PSA) is utilized with dynamic bandwidth. This can increase D2D duty cycle for example from 2.78% up to 33.6% (i.e. 2.78%×12) using 12 sub-bands of 1 PRB.

According to embodiments, the CCA can be performed at sub-bands smaller than the transmission bandwidth, and this can improve spectral efficiency. For example, with a 100 kHz interferer operation at 50%, a D2D transmission BW of 6PRB and CCA BW of 1PRB, spectrum utilization is improved from 50% to 91.7% (i.e. 50+5/6×50).

According to embodiments, using the hybrid transmission with and without PSA illustrated above, the resulting duty cycle can be increased from 1% as shown using the following assumptions:
 1 SF in every 5 SFs is available for D2D transmission during active cellular (accurate for LTE-M, NB-IoT would be higher). 1 SF for reception and 1 SF for transmission, and therefore 1 SF is available for transmission in every 10 SFs and 1 SF is available for reception in every 10 SFs.
 Active cellular connected mode with D2D transmission is 5% of the time.
 There are 4 sub-bands and each sub-band has 3 PRBs. The four sub-bands are non-overlapping. Three of the four sub-bands are for PSA mode and one sub-band is for NPSA mode.

According to embodiments, using the hybrid transmission mode with and without PSA illustrated above, the maximum duty cycle can be calculated as a combination of NPSA used 5% of the time and PSA used 95% of the time. When operation in PSA, the resulting D2D transmission duty cycle would be 8.34% (3×2.78%). When operating in the NPSA mode, the long term duty cycle is 0.5% (5%×1SF/10SF) which is less than 1% thus the regulatory limit of 1% does not need to be applied. The resulting maximum aggregated duty cycle for the hybrid transmission mode is 95%*8.34%+5%*0.5%=7.923+0.025=7.948%.

As will be readily understood by the worker skilled in the art, the figures and the accompanying detailed description are for illustrative purposes. It will be readily understood that for example if a figure identifies a gateway (GW) or an end node (EN), either of these network devices may be envisioned as another configuration of a network device, for example a mesh node or other configuration. It will also be readily understood that, for example, if a figure illustrates cellular activity when a gateway drops a D2D communication, this is to be considered merely as an example. The communication that is dropped may equally be considered to be a cellular communication or a second D2D communication or other type of wireless communication as would be readily understood. It my be further envisioned that another D2D communication or other wireless communication type may be enabled when a gateway drops a D2D communication.

Figure 19:
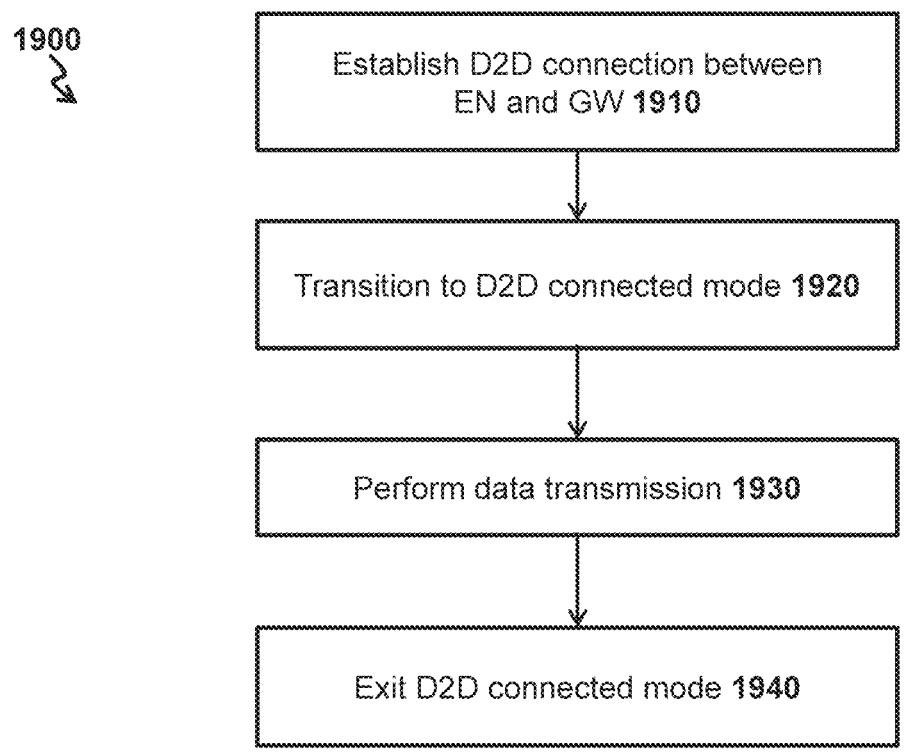
FIG. 19 illustrates a method for supporting device-to-device (D2D) communication in a wireless network, in accordance with embodiments.

FIG. 19 is a method for supporting device-to-device (D2D) communication in a wireless network, in accordance with embodiments of the present disclosure. The method includes upon synchronization of the EN and the GW, establishing 1910 a D2D connection between the EN and the GW using a D2D connection request (CRQ) and a D2D connection response (CRS) and transitioning 1920 to a D2D connected mode. The method further includes performing 1930 data transmission between the EN and the GW and exiting 1940 from the D2D connected mode upon one or more of receipt of a D2D connection release request and expiry of an inactivity timer. Each of the EN and the GW is configured to perform both the D2D communication and cellular communication.

In some embodiments, establishing the D2D connection includes transmitting the D2D CRQ and receiving the D2D CRS with acceptance prior to transitioning to the D2D connected mode.

In some embodiments, when the GW and the EN are engaged with two asynchronous cellular serving cells, the method further includes synchronizing the EN and the GW. Synchronizing includes detecting, by the EN, surrounding base transceiver stations (BTSs) and discovering, by the EN, the GW attached to one of the detected BTSs. In some embodiments, synchronizing further includes prioritizing, by the EN, the detected BTSs based on one or more of a pre-configured list of prioritized public land mobile networks (PLMNs) and a quality of signal detection.

In some embodiments, the EN synchronizes with the GW using a cellular synchronization signal. In some embodiments, the EN identifies the GW using a D2D synchronization signal transmitted by the GW. In some embodiments, the GW transmits the D2D synchronization signal every Nth reception occasion (RO), wherein the N is indicative of one or more of a timing accuracy requirement of the RO and a timing accuracy capability of the EN.

In some embodiments, the GW identifies an imminent upcoming cellular activity during the D2D connected mode. The method further includes terminating the D2D connection between the EN and the GW using an immediate release request (RRQ IR) and re-establishing the D2D connection between the EN and the GW.

In some embodiments, the imminent upcoming cellular activity has a known duration. The method further includes transmitting, from the GW to the EN, a D2D immediate release request including an indication of the known duration of the cellular activity and upon receiving the D2D immediate release request, transitioning, by the EN, to a sleep mode for the known duration. Upon completion of the cellular activity, the method further includes transitioning, by the EN, to a wake up mode and transmitting, from the GW to the EN, the D2D CRQ to re-establish the D2D connection within a connection request time period.

In some embodiments, the method further includes transmitting, from the GW to the EN, a D2D immediate release request with the field indicating that the imminent upcoming cellular activity has an unknown duration. Upon receiving the D2D immediate release request, the method further includes transitioning, by the EN, to a short D2D discontinuous reception (DRX) mode for a short D2D DRX cycle and to a wake up mode for a short D2D reception opportunity (RO) duration. The method further includes repeating the transitions if the cellular activity is not complete during the short D2D RO duration. Upon completion of the cellular activity, the method further includes transmitting, from the GW to the EN, the CRQ to re-establish the D2D connection during the wake up mode.

Figure 20:
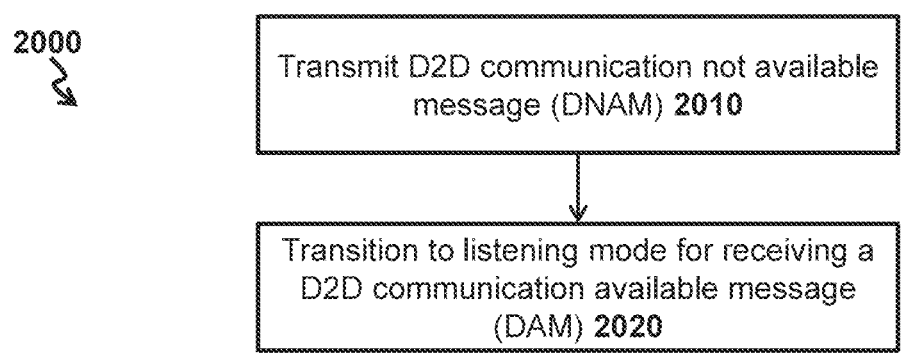
FIG. 20 illustrates a method for supporting device-to-device (D2D) communication in a wireless network, in accordance with embodiments.

FIG. 20 is a method for supporting device-to-device (D2D) communication in a wireless network, in accordance with embodiments of the present disclosure. The method is performed between a first D2D device (D1) and a second D2D device (D2). The method includes during a period where the D1 and the D2 are available for active D2D communications therebetween and when the D2 identifies a need for a second communication with at least one of a base station or a different D2D device, transmitting, 2010, by the D2, a D2D communication not available message (DNAM) to the D1. The DNAM indicates that one or more of the D1 and the D2 are unavailable for active D2D communications therebetween. Upon receipt of the DNAM by the D1, transitioning, 2020, by the D1, to a listening mode for receiving at least a D2D communication available message (DAM) from the D2. The DAM indicates that the D1 and the D2 are available for active D2D communications therebetween and the D2 is capable of performing both the D2D communication and cellular communication non-simultaneously.

In some embodiments, during the listening mode, upon the D2 identifying a need for a third communication, transmitting by the D2, a second DNAM. In some embodiments, one or more of the DNAM and the second DNAM are transmitted to one or more of a plurality of devices, wherein the plurality of devices includes at least the D1. In some embodiments, transitioning to the listening mode includes transitioning, by the D1, to a power saving mode, wherein the D1 sleeps for at least one sleep period upon transition to the power saving mode. In some embodiments a duration of the sleep period is specified in one or more of the DNAM and the second DNAM. In some embodiments, upon expiry of the sleep period, the D1 listens for one or more of the second DNAM or the DAM for a receive mode period. In some embodiments, upon non-receipt of the DAM or the second DNAM before expiry of the receive mode period, transitioning, by the D1, to a short power saving mode, wherein the D1 sleeps for a short sleep period during the short power saving mode. Upon expiry of the short sleep period, listening, by the D1, for one or more of the DAM and the second DNAM during a short wake up period.

In some embodiments, one or more of the DNAM and the second DNAM indicate whether one or more of the second communication or the third communication has a known duration.

In some embodiments, transitioning to the listening mode includes transitioning, by the D1, to a short power saving mode, wherein the D1 sleeps for a short sleep period during the short power saving mode and upon expiry of the short sleep period, listening, by the D1, for the DAM or the second DNAM during a short wake up period. In some embodiments, the short sleep period has a duration, the duration is one or more of: a preconfigured period, a period signalled by the D2 and a period calculated based on a known formula. In some embodiments, the short sleep period is signalled by the D2 within the DNAM. In some embodiments, upon the D1 receiving the DAM, transmitting, by the D1, a message to the D2.

Figure 21:
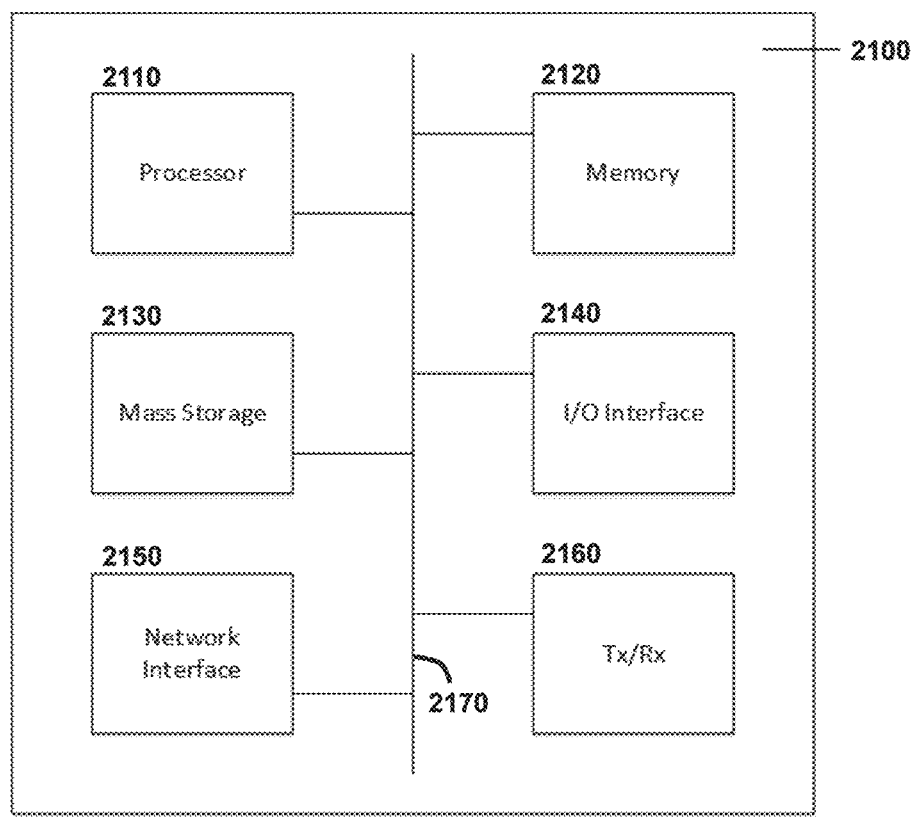
FIG. 21 is a schematic diagram of an electronic device, according to embodiments.

FIG. 21 is a schematic diagram of an electronic device 2100 that may perform any or all of the steps of the above methods and features described herein, according to different embodiments. For example, network devices, network nodes, end nodes, computer devices, wireless gateways, mobility routers, access point devices and controller devices can be configured as the electronic device. End-user computers, smartphones, IoT devices, etc. can be also configured as electronic devices.

As shown, the device includes a processor 2110, memory 2120, non-transitory mass storage 2130, I/O interface 2140, network interface 2150, and a transceiver 2160, all of which are communicatively coupled via bi-directional bus 2170. According to certain embodiments, any or all of the depicted elements may be utilized, or only a subset of the elements. Further, the device 2100 may contain multiple instances of certain elements, such as multiple processors, memories, or transceivers. Also, elements of the hardware device may be directly coupled to other elements without the bi-directional bus.

The memory 2120 may include any type of non-transitory memory such as static random access memory (SRAM), dynamic random access memory (DRAM), synchronous DRAM (SDRAM), read-only memory (ROM), any combination of such, or the like. The mass storage element 2130 may include any type of non-transitory storage device, such as a solid state drive, hard disk drive, a magnetic disk drive, an optical disk drive, USB drive, or any computer program product configured to store data and machine executable program code. According to certain embodiments, the memory 2120 or mass storage 2130 may have recorded thereon statements and instructions executable by the processor 2110 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for supporting a device-to-device (D2D) communication in a wireless network, the method performed between a first D2D device (D1) and a second D2D device (D2), the method comprising:
   transmitting by the D2, a D2D communication not available message (DNAM) to the D1 during a period where the D1 and the D2 are available for active D2D communications therebetween and when the D2 identifies a need for a second communication with at least one of a base station or a different D2D device;
   wherein the DNAM indicates that one or more of the D1 and the D2 are unavailable for active D2D communications therebetween;
   transitioning, by the D1, upon receipt of the DNAM by the D1, to a listening mode for receiving at least a D2D communication available message (DAM) from the D2;
   wherein the DAM indicates that the D1 and the D2 are available for active D2D communications therebetween, and
   wherein the D2 is capable of performing both the D2D communication and cellular communication non-simultaneously.

2. The method of claim 1, wherein during the listening mode, transmitting by the D2, a second DNAM upon the D2 identifying a need for a third communication.

3. The method of claim 2, wherein transitioning to the listening mode includes:
   transitioning, by the D1, to a power saving mode, wherein the D1 sleeps for at least one sleep period upon transition to the power saving mode.

4. The method of claim 2, wherein the DNAM or the second DNAM indicates whether one or more of the second communication or a third communication has a known duration.

5. The method of claim 1, wherein the DNAM is transmitted to one or more of a plurality of devices, wherein the plurality of devices includes at least the D1.

6. The method of claim 1, wherein transitioning to the listening mode includes:
   transitioning, by the D1, to a power saving mode, wherein the D1 sleeps for at least one sleep period upon transition to the power saving mode.

7. The method of claim 6, wherein a duration of the sleep period is specified in one or more of the DNAM and the second DNAM.

8. The method of claim 6, wherein upon expiry of the sleep period, the D1 listens for one or more of the second DNAM or the DAM for a receive mode period.

9. The method of claim 8, wherein upon non-receipt of the DAM or the second DNAM before expiry of the receive mode period, transitioning, by the D1, to a short power saving mode, wherein the D1 sleeps for a short sleep period during the short power saving mode; and
   upon expiry of the short sleep period, listening, by the D1, for one or more of the DAM and the second DNAM during a short wake up period.

10. The method of claim 1, wherein the DNAM or the second DNAM indicates whether one or more of the second communication or a third communication has a known duration.

11. The method of claim 1, wherein transitioning to the listening mode includes:
    transitioning, by the D1, to a short power saving mode, wherein the D1 sleeps for a short sleep period during the short power saving mode; and
    upon expiry of the short sleep period, listening, by the D1, for the DAM or the second DNAM during a short wake up period.

12. The method of 11, wherein the short sleep period has a duration, the duration is one or more of: a preconfigured period, a period signalled by the D2 and a period calculated based on a known formula.

13. The method of 11, wherein the short sleep period is signalled by the D2 within the DNAM.

14. The method of claim 1 further including:
    upon the D1 receiving the DAM, transmitting, by the D1, a message to the D2.

15. An end node (EN) supporting device-to-device (D2D) communication in a wireless network comprising:
    a network interface for receiving data from and transmitting data to network devices connected to the wireless network;
    a processor; and
    a machine readable memory storing machine executable instructions which when executed by the processor configure the EN to:
      during a period where the EN and a D2D device are available for active D2D communications therebetween and when the D2D device identifies a need for a second communication with at least one of a base station or a different D2D device, receive a D2D communication not available message (DNAM) from the D2D device;
      wherein the DNAM indicates that one or more of the EN and the D2D device are unavailable for active D2D communications therebetween;
      transition to a listening mode for receiving at least a D2D communication available message (DAM) from the D2D device upon receipt of the DNAM by the EN;

wherein the DAM indicates that the EN and the D2D device are available for active D2D communications therebetween, and wherein the D2D device is capable of performing both the D2D communication and cellular communication non-simultaneously.

16. A gateway (GW) supporting device-to-device (D2D) communication in a wireless network comprising:
- a network interface for receiving data from and transmitting data to network devices connected to the wireless network;
- a processor; and
- a machine readable memory storing machine executable instructions which when executed by the processor configure the GW to:
  - during a period where the GW and a D2D device are available for active D2D communications therebetween and when the D2D device identifies a need for a second communication with at least one of a base station or a different D2D device, receive a D2D communication not available message (DNAM) from the D2D device;
  - wherein the DNAM indicates that one or more of the GW and the D2D device are unavailable for active D2D communications therebetween;
  - upon receipt of the DNAM by the GW, transition to a listening mode for receiving at least a D2D communication available message (DAM) from the D2D device;
  - wherein the DAM indicates that the GW and the D2D device are available for active D2D communications therebetween, and
  - wherein the D2D device is capable of performing both the D2D communication and cellular communication non-simultaneously.

17. A mesh node (MN) supporting device-to-device (D2D) communication in a wireless network comprising:
- a network interface for receiving data from and transmitting data to network devices connected to the wireless network;
- a processor; and
- a machine readable memory storing machine executable instructions which when executed by the processor configure the MN to:
  - during a period where the MN and a D2D device are available for active D2D communications therebetween and when the D2D device identifies a need for a second communication with at least one of a base station or a different D2D device, receive a D2D communication not available message (DNAM) from the D2D device;
  - wherein the DNAM indicates that one or more of the MN and the D2D device are unavailable for active D2D communications therebetween;
  - upon receipt of the DNAM by the MN, transition to a listening mode for receiving at least a D2D communication available message (DAM) from the D2D device;
  - wherein the DAM indicates that the MN and the D2D device are available for active D2D communications therebetween, and
  - wherein the D2D device is capable of performing both the D2D communication and cellular communication non-simultaneously.

* * * * *